(12) United States Patent
Okae et al.

(10) Patent No.: US 10,707,528 B2
(45) Date of Patent: Jul. 7, 2020

(54) SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: MURATA MANUFACTURING CO., LTD., Kyoto (JP)

(72) Inventors: Izaya Okae, Kyoto (JP); Kazumasa Takeshi, Kyoto (JP); Tadahiko Kubota, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 16/193,012

(22) Filed: Nov. 16, 2018

(65) Prior Publication Data

US 2019/0103631 A1    Apr. 4, 2019

Related U.S. Application Data

(63) Continuation of application No. PCT/JP2017/011215, filed on Mar. 21, 2017.

(30) Foreign Application Priority Data

May 17, 2016 (JP) .................. 2016-098569

(51) Int. Cl.
*H01M 10/00* (2006.01)
*H01M 10/0565* (2010.01)
(Continued)

(52) U.S. Cl.
CPC ... *H01M 10/0565* (2013.01); *H01M 10/0525* (2013.01); *H01M 10/425* (2013.01);
(Continued)

(58) Field of Classification Search
CPC ............ Y02E 60/122; H01M 10/0569; H01M 10/425; H01M 2010/4271; H01M 2300/0037; H01M 2300/0085
See application file for complete search history.

(56) References Cited

U.S. PATENT DOCUMENTS 5,296,318 A    3/1994  Gozdz et al.
9,070,948 B2   6/2015  Yu
(Continued)

FOREIGN PATENT DOCUMENTS

JP    H08507407 A    8/1996
JP    H10261437 A    9/1998
(Continued)

OTHER PUBLICATIONS

International Search Report for Application No. PCT/JP2017/011215, dated May 16, 2017.

*Primary Examiner* — Chanceity N Robinson
*Assistant Examiner* — Monique M Wills
(74) *Attorney, Agent, or Firm* — K&L Gates LLP

(57) ABSTRACT

The secondary battery includes an electrolyte layer including an electrolytic solution and a polymer compound, a positive electrode, and a negative electrode. The polymer compound includes one or both of a first polymer compound and a second polymer compound. The first polymer compound further includes a first homopolymer and one or both of a second homopolymer and a second copolymer. The second polymer compound further includes a third copolymer and one or both of a fourth homopolymer and a fourth copolymer.

13 Claims, 5 Drawing Sheets

(51) Int. Cl.
    *H01M 10/0525*     (2010.01)
    *H01M 10/42*        (2006.01)
    *H01M 10/0569*     (2010.01)

(52) U.S. Cl.
    CPC ............ *H01M 10/0569* (2013.01); *H01M 2010/4271* (2013.01); *H01M 2220/20* (2013.01); *H01M 2300/0037* (2013.01); *H01M 2300/0082* (2013.01); *H01M 2300/0085* (2013.01); *H01M 2300/0091* (2013.01); *Y02E 60/122* (2013.01); *Y02T 10/7011* (2013.01)

(56) References Cited

U.S. PATENT DOCUMENTS

| | | | |
|---|---|---|---|
| 2011/0064988 A1 | 3/2011 | Yu | |
| 2011/0200885 A1* | 8/2011 | Yamada | H01M 10/052 429/306 |
| 2012/0326500 A1* | 12/2012 | Hirose | H01M 4/5825 307/9.1 |
| 2016/0285066 A1* | 9/2016 | Sakaguchi | H01M 2/145 |
| 2016/0329613 A1* | 11/2016 | Kusachi | H01M 10/052 |

FOREIGN PATENT DOCUMENTS

| | | |
|---|---|---|
| JP | 2000243133 A | 9/2000 |
| JP | 2001143752 A | 5/2001 |
| JP | 2001266942 A | 9/2001 |
| JP | 2012510704 A | 5/2012 |
| JP | 2015092487 A | 5/2015 |

\* cited by examiner

SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCE TO RELATED APPLICATIONS

The present application is a continuation of PCT patent application no. PCT/JP2017/011215, filed on Mar. 21, 2017, which claims priority to Japanese patent application no. JP2016-098569 filed on May 17, 2016, the entire contents of which are being incorporated herein by reference.

BACKGROUND

The present technology generally relates to a secondary battery including an electrolyte layer including an electrolytic solution and a polymer compound, and a battery pack, an electric vehicle, an electric power storage system, an electric power tool, and an electronic apparatus that use the secondary battery.

Various electronic apparatuses such as a mobile phone and a personal digital assistant (PDA) have been widely used, and it has been demanded to reduce the sizes and weights of the electronic apparatuses and to achieve their long life. Accordingly, as an electric power source for the electronic apparatuses, a battery, in particular, a small and light-weight secondary battery capable of providing high energy density has been developed.

It has been considered to apply a secondary battery not only to the foregoing electronic apparatuses, but also to other applications. Examples of other applications include a battery pack detachably mounted in electronic apparatuses or the like, an electric vehicle such as an electric automobile, an electric power storage system such as a home electric power server, and an electric power tool such as an electric drill.

The secondary battery includes an electrolytic solution together with a positive electrode and a negative electrode. The electrolytic solution is mounted in the secondary battery in a state of being impregnated in a separator, and other than this, the electrolytic solution is mounted in the secondary battery in a state of being held by a polymer compound. The latter secondary battery includes an electrolyte layer that is a so-called gel electrolyte. In the secondary battery including this electrolyte layer, leakage of the electrolytic solution is prevented.

A configuration of the polymer compound contained in the electrolyte layer may largely influence battery characteristics of the secondary battery, which has led to various considerations on the configuration of the polymer compound.

SUMMARY

The present technology generally relates to a secondary battery including an electrolyte layer including an electrolytic solution and a polymer compound, and a battery pack, an electric vehicle, an electric power storage system, an electric power tool, and an electronic apparatus that use the secondary battery.

The electronic apparatuses and the like are increasingly having higher performance and multi-functionality. Accordingly, the frequency of use of electronic apparatuses and the like increases, and, at the same time, a use environment of the electronic apparatuses and the like expands. For this reason, there is still room for improvement in battery characteristics of secondary batteries.

Accordingly, it is desirable to provide a secondary battery, a battery pack, an electric vehicle, an electric power storage system, an electric power tool, and an electronic apparatus that are capable of providing excellent battery characteristics.

According to an embodiment of the present disclosure, a secondary battery is provided. The secondary battery includes an electrolyte layer including an electrolytic solution and a polymer compound, a positive electrode, and a negative electrode. The polymer compound includes one or both of a first polymer compound and a second polymer compound.

The first polymer compound includes a first homopolymer including no vinylidene fluoride and has a solubility parameter of 17 $MPa^{1/2}$ to 20 $MPa^{1/2}$ and a weight average molecular weight of no less than 100,000 and one or both of a second homopolymer including vinylidene fluoride and a second copolymer including vinylidene fluoride.

The second polymer compound includes a third copolymer including vinylidene fluoride and one or more of hexafluoropropylene, chlorotrifluoroethylene, tetrafluoroethylene, and monomethyl maleate and a copolymerization amount of one or more of the hexafluoropropylene, the chlorotrifluoroethylene, the tetrafluoroethylene, and the monomethyl maleate is no less than 15% by weight, and one or both of a fourth homopolymer including vinylidene fluoride and a fourth copolymer including vinylidene fluoride and one or more of hexafluoropropylene, chlorotrifluoroethylene, tetrafluoroethylene and monomethyl maleate and the copolymerization amount of one or more of hexafluoropropylene, chlorotrifluoroethylene, tetrafluoroethylene and monomethyl maleate is less than 15% by weight.

Each of a battery pack, an electric vehicle, an electric power storage system, an electric power tool, and an electronic apparatus according to an embodiment of the present technology includes a secondary battery, and the secondary battery has a configuration similar to that of the secondary battery of an embodiment of the present technology described above.

Here, the "homopolymer" is a polymer containing only one component or, in other words, is a compound obtained by a polymerization reaction using only one monomer. On the other hand, the "copolymer" is a polymer containing two or more components or, in other words, is a compound obtained by a polymerization reaction using two or more monomers.

The values of the "solubility parameter ($MPa^{1/2}$)" conform to the values published in Polymer Handbook (Publisher: Wiley-Interscience; Edition: 4th edition, Publication Date: May 29, 2003).

According to the embodiments of the present technology, since the polymer compound contained in the electrolyte layer includes one or both of the first polymer compound and the second polymer compound, excellent battery characteristics can be obtained.

In addition, the same effect can be provided by the battery pack, the electric vehicle, the electric power storage system, the electric power tool, or the electronic apparatus of an embodiment of the present technology.

The effects described herein are non-limiting, and may be any one of effects described in the present technology and where the present technology should not be interpreted as

DETAILED DESCRIPTION

The present technology generally relates to a secondary battery including an electrolyte layer including an electrolytic solution and a polymer compound, and a battery pack, an electric vehicle, an electric power storage system, an electric power tool, and an electronic apparatus that use the secondary battery. As described herein, the present disclosure will be described based on examples with reference to the drawings, but the present disclosure is not to be considered limited to the examples, and various numerical values and materials in the examples are considered by way of example.

First, a secondary battery of an embodiment of the present technology is described.

Figure 1:
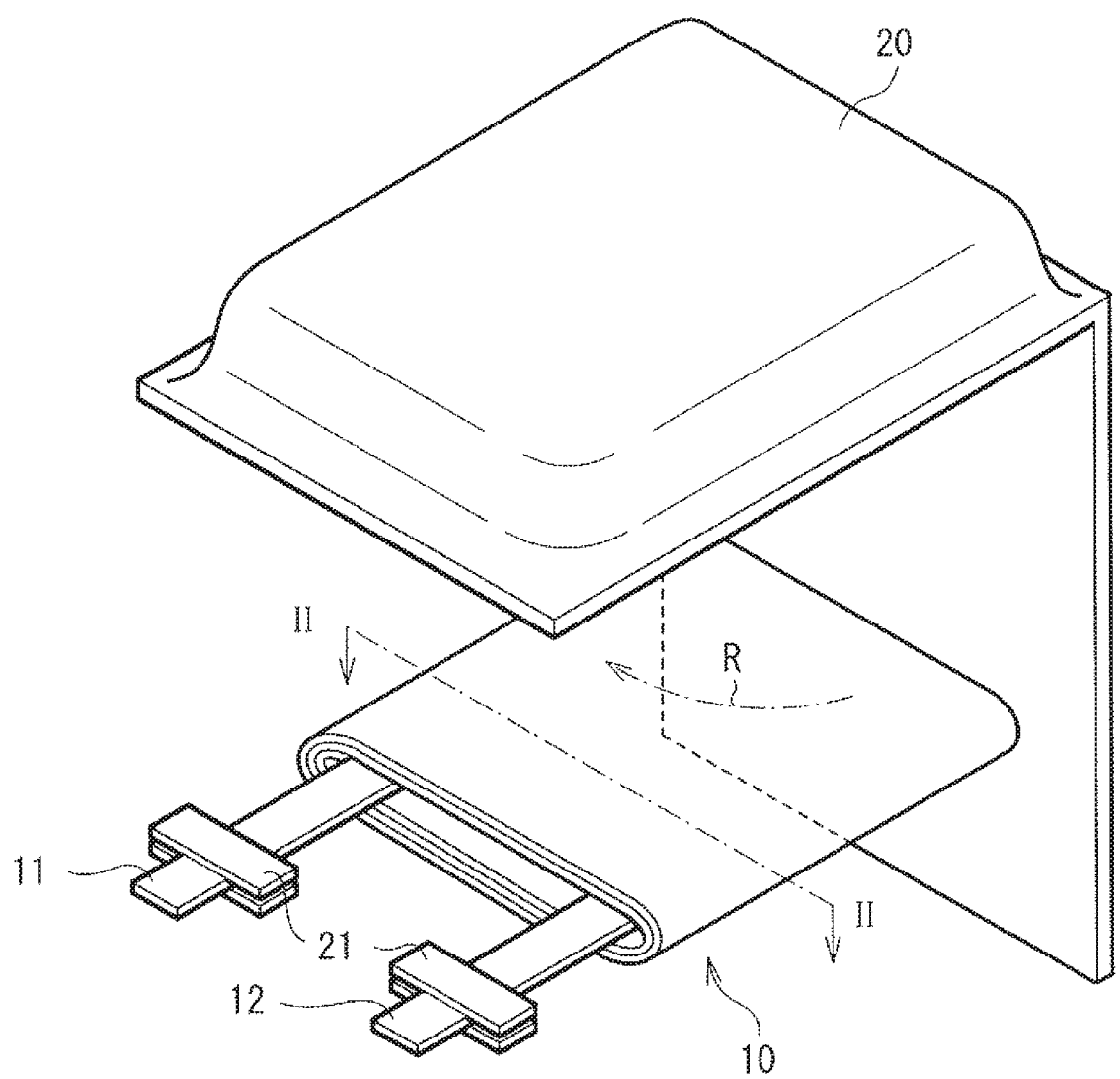
FIG. 1 is a perspective view illustrating a configuration of a secondary battery (laminated-film-type) according to an embodiment of the present technology.
Figure 2:
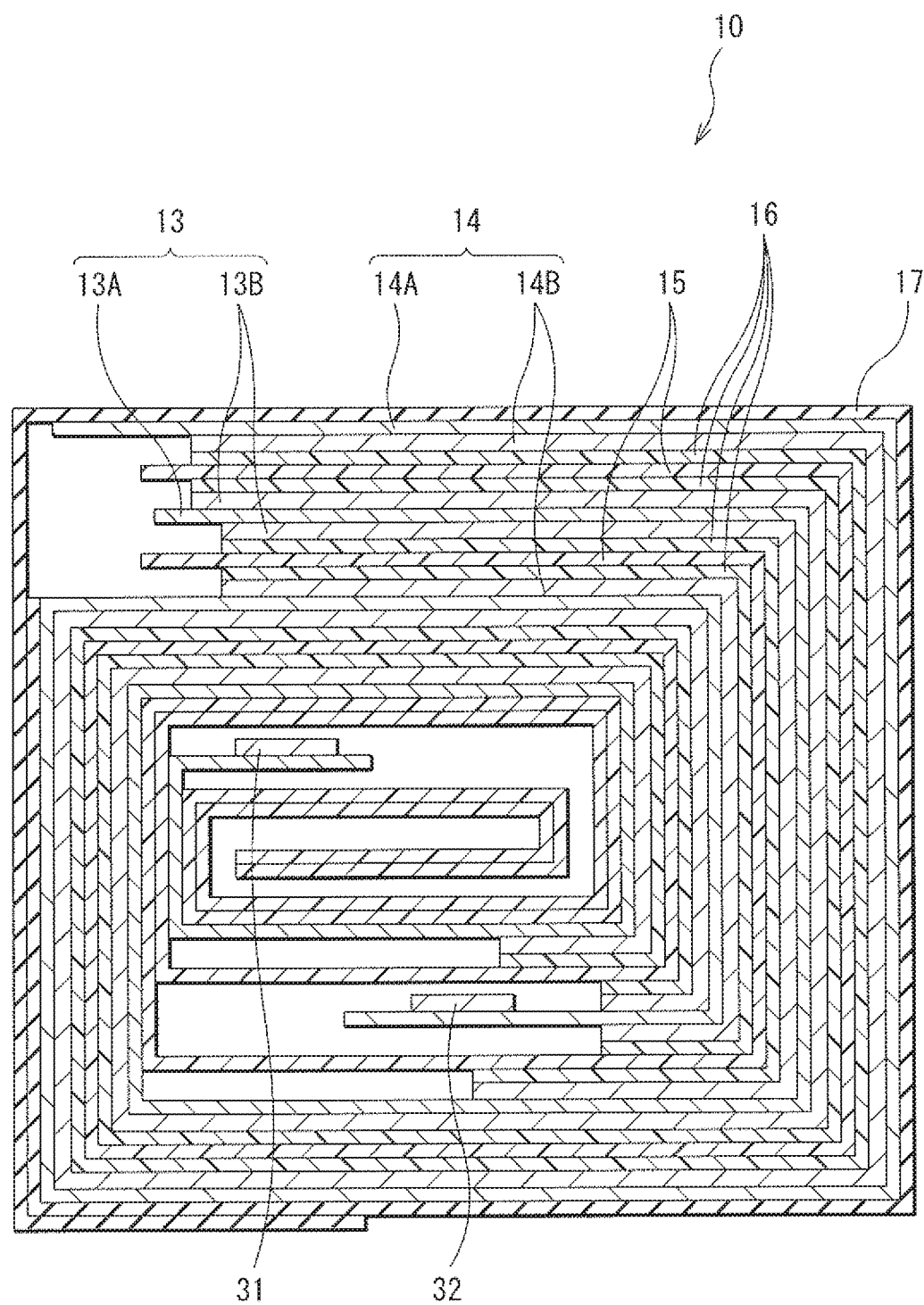
FIG. 2 is a cross-sectional view of a spirally wound electrode body taken along a line II-II illustrated in FIG. 1.

FIG. 1 illustrates a perspective configuration of a secondary battery. FIG. 2 illustrates a cross-sectional configuration of a spirally wound electrode body 10 taken along a line II-II illustrated in FIG. 1.

The secondary battery described herein obtains capacity of a negative electrode 14 by insertion and extraction of an electrode reactant, and has a so-called laminated-film-type battery structure.

The "electrode reactant" is a substance related to an electrode reaction, and, for example, an electrode reactant used in a lithium ion secondary battery in which battery capacity is obtained by insertion and extraction of lithium (Li) is lithium (or lithium ion). A configuration of the secondary battery of the present technology is described below by reference to a case where the secondary battery is a lithium ion secondary battery.

In the secondary battery, for example, as illustrated in FIG. 1, the spirally wound electrode body 10 as a battery element is contained inside a film-like outer package member 20. In the spirally wound electrode body 10, for example, a positive electrode 13 and a negative electrode 14 stacked with a separator 15 and an electrolyte layer 16 interposed therebetween are spirally wound. A positive electrode lead 11 is attached to the positive electrode 13, and a negative electrode lead 12 is attached to the negative electrode 14. An outermost periphery of the spirally wound electrode body 10 is protected by a protective tape 17.

The positive electrode lead 11 is led out from inside to outside of the outer package member 20, for example. The positive electrode lead 11 contains, for example, one or more of conductive materials such as aluminum (Al). The negative electrode lead 12 is led out from inside to outside of the outer package member 20 in the same direction as the positive electrode lead 11, for example. The negative electrode lead 12 contains, for example, one or more of conductive materials such as copper (Cu), nickel (Ni), and stainless steel. These conductive materials may be in the shape of, for example, a thin plate or mesh.

The outer package member 20 is, for example, one film that is foldable in a direction of an arrow R illustrated in FIG. 1, and the outer package member 20 has a depression for containing the spirally wound electrode body 10 in part thereof. The outer package member 20 is a laminated film in which a fusion-bonding layer, a metal layer, and a surface protective layer are stacked in this order, for example. In a process of manufacturing the secondary battery, the outer package member 20 is folded such that the fusion-bonding layers face each other with the spirally wound electrode body 10 interposed therebetween, and outer edge portions of the fusion-bonding layers are fusion-bonded. Alternatively, two laminated films bonded to each other by, for example, an adhesive may form the outer package member 20. The fusion-bonding layer includes, for example, one or more of films of polyethylene, polypropylene, and other materials. The metal layer includes, for example, one or more of an aluminum foil and the like. The surface protective layer includes, for example, one or more of films of nylon, polyethylene terephthalate, and other materials.

In particular, the outer package member 20 is preferably an aluminum laminated film in which a polyethylene film, an aluminum foil, and a nylon film are stacked in this order. However, the outer package member 20 may be a laminated film having any other laminated structure, a polymer film such as polypropylene, or a metal film.

For example, a close-contact film 21 is inserted between the outer package member 20 and the positive electrode lead 11 in order to prevent entrance of the outside air. Moreover, for example, the close-contact film 21 is inserted between the outer package member 20 and the negative electrode lead 12. The close-contact film 21 contains one or more of materials having close-contact characteristics to both the positive electrode lead 11 and the negative electrode lead 12. Examples of the material having close-contact characteristics include polyolefin resin, and more specific examples thereof include polyethylene, polypropylene, modified polyethylene, and modified polypropylene.

As shown in FIG. 2, the positive electrode 13 includes, for example, a positive electrode current collector 13A and a positive electrode active material layer 13B provided on the positive electrode current collector 13A.

The positive electrode active material layer 13B may be provided on only one surface or both surfaces of the positive electrode current collector 13A. FIG. 2 illustrates, for example, the case where the positive electrode active material layers 13B are provided on both surfaces of the positive electrode current collector 13A.

The positive electrode current collector 13A contains, for example, one or more of conductive materials. The kind of the conductive material is not particularly limited; however, examples of the conductive material include metal materials such as aluminum, nickel, and stainless steel, and the metal material may be an alloy. The positive electrode current collector 13A may be configured of a single layer, or may be configured of multiple layers.

The positive electrode active material layer 13B includes one or more of positive electrode materials capable of inserting and extracting lithium as a positive electrode active material. However, the positive electrode active material layer 13B may further contain one or more of other materials such as a positive electrode binder and a positive electrode conductive agent.

The positive electrode material is preferably one or more of lithium-containing compounds. The kind of the lithium-containing compound is not specifically limited, but in particular is preferably a lithium-containing composite oxide and a lithium-containing phosphate compound. This is because a high energy density can be obtained.

The "lithium-containing composite oxide" is an oxide containing lithium and one or more of other elements as constituent elements, and the "other elements" are elements other than lithium. The lithium-containing oxide has, for example, one or more crystal structures such as a layered rock-salt type crystal structure and a spinel type crystal structure.

The "lithium-containing phosphate compound" is a phosphate compound containing lithium and one or more of other elements as constituent elements. The lithium-containing phosphate compound has, for example, one or more crystal structures such as an olivine type crystal structure.

The kind of the other element is not particularly limited as long as the other element is one or more of arbitrary elements (except for lithium). In particular, the other elements are preferably one or more of elements that belong to Groups 2 to 15 in the long-periodic table. More specifically, the other elements are more preferably one or more of metal elements of nickel, cobalt, manganese, iron, and the like. This is because a high voltage can be obtained.

Examples of the lithium-containing composite oxide having the layered rock-salt type crystal structure include one or more of compounds represented by the following respective formulas (1) to (3).

$$Li_aMn_{(1-b-c)}Ni_bM1_cO_{(2-d)}F_e \qquad (1)$$

(M1 is at least one element of cobalt, magnesium, aluminum, boron, titanium, vanadium, chromium, iron, copper, zinc, zirconium, molybdenum, tin, calcium, strontium, and tungsten. "a" to "e" satisfy $0.8 \leq a \leq 1.2$, $0 < b < 0.5$, $0 \leq c \leq 0.5$, $(b+c) < 1$, $-0.1 \leq d \leq 0.2$, and $0 \leq e \leq 0.1$. It is to be noted that the composition of lithium varies depending on charge and discharge states, and "a" is a value in a completely-discharged state.)

$$Li_aNi_{(1-b)}M2_bO_{(2-c)}F_d \qquad (2)$$

(M2 is at least one element of cobalt, manganese, magnesium, aluminum, boron, titanium, vanadium, chromium, iron, copper, zinc, molybdenum, tin, calcium, strontium, and tungsten. "a" to "d" satisfy $0.8 \leq a \leq 1.2$, $0.005 \leq b \leq 0.5$, $-0.1 \leq c \leq 0.2$, and $0 \leq d \leq 0.1$. It is to be noted that the composition of lithium varies depending on charge and discharge states, and "a" is a value in a completely-discharged state.)

$$Li_aCo_{(1-b)}M3_bO_{(2-c)}F_d \qquad (3)$$

(M3 is at least one element of nickel, manganese, magnesium, aluminum, boron, titanium, vanadium, chromium, iron, copper, zinc, molybdenum, tin, calcium, strontium, and tungsten. "a" to "d" satisfy $0.8 \leq a \leq 1.2$, $0 \leq b < 0.5$, $-0.1 \leq c \leq 0.2$, and $0 \leq d \leq 0.1$. It is to be noted that the composition of lithium varies depending on charge and discharge states, and "a" is a value in a completely-discharged state.)

Examples of the lithium-containing composite oxide having the layered rock-salt type crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{0.2}Mn_{0.52}Co_{0.175}Ni_{0.1}O_2$, and $Li_{1.15}(Mn_{0.65}Ni_{0.22}Co_{0.13})O_2$.

In the case where the lithium-containing composite oxide having the layered rock-salt type crystal structure contains, as constituent elements, nickel, cobalt, manganese, and aluminum, an atomic ratio of nickel is preferably not less than 50 at %. This is because a high energy density can be obtained.

Examples of the lithium-containing composite oxide having the spinel type crystal structure include compounds represented by the following formula (4).

$$Li_aMn_{(2-b)}M4_bO_cF_d \qquad (4)$$

(M4 is at least one element of cobalt, nickel, magnesium, aluminum, boron, titanium, vanadium, chromium, iron, copper, zinc, molybdenum, tin, calcium, strontium, and tungsten. "a" to "d" satisfy $0.9 \leq a \leq 1.1$, $0 \leq b \leq 0.6$, $3.7 \leq c \leq 4.1$, and $0 \leq d \leq 0.1$. It is to be noted that the composition of lithium varies depending on charge and discharge states, and "a" is a value in a completely-discharged state.)

Examples of the lithium-containing composite oxide having the spinel type crystal structure include $LiMn_2O_4$.

Examples of the lithium-containing phosphate compound having the olivine type crystal structure include compounds represented by the following formula (5).

$$Li_aM5PO_4 \qquad (5)$$

(M5 is at least one element of cobalt, manganese, iron, nickel, magnesium, aluminum, boron, titanium, vanadium, niobium, copper, zinc, molybdenum, calcium, strontium, tungsten, and zirconium. "a" satisfies $0.9 \leq a \leq 1.1$. It is to be noted that the composition of lithium varies depending on charge and discharge states, and "a" is a value in a completely-discharged state.)

Examples of the lithium-containing phosphate compound having the olivine type crystal structure include $LiFePO_4$, $LiMnPO_4$, $LiFe_{0.5}Mn_{0.5}PO_4$, and $LiFe_{0.3}Mn_{0.7}PO_4$.

The lithium-containing composite oxide may be, for example, a compound represented by the following formula (6).

$$(Li_2MnO_3)_x(LiMnO_2)_{1-x} \qquad (6)$$

(x satisfies $0 \leq x \leq 1$.)

In addition, the positive electrode material may be, for example, an oxide, a disulfide, a chalcogenide, or a conductive polymer. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene.

However, the positive electrode material is not limited to the foregoing materials, and other materials may be used.

The positive electrode binder contains, for example, one or more of synthetic rubber, polymer compounds, and the like. Examples of the synthetic rubber include styrenebutadiene-based rubber, fluororubber, and ethylene propylene diene. Examples of the polymer compounds include polyvinylidene fluoride, polyacrylic acid, and polyimide.

The positive electrode conductive agent contains, for example, one or more of carbon materials and the like. Examples of the carbon materials include graphite, carbon black, acetylene black, and Ketjen black. The positive electrode conductive agent may be a metal material, a conductive polymer, or the like as long as the positive electrode conductive agent has electric conductivity.

As shown in FIG. 2, the negative electrode 14 includes, for example, a negative electrode current collector 14A and a negative electrode active material layer 14B provided on the negative electrode current collector 14A.

The negative electrode active material layer 14B may be provided on only one surface or both surfaces of the negative electrode current collector 14A. FIG. 2 illustrates, for example, the case where the negative electrode active material layers 14B are provided on both surfaces of the negative electrode current collector 14A.

The negative electrode current collector 14A contains, for example, one or more of conductive materials. The kind of the conductive material is not particularly limited; however, examples of the conductive material include metal materials such as copper, aluminum, nickel, and stainless steel, and the metal material may be an alloy. The negative electrode current collector 14A may be configured of a single layer, or may be configured of multiple layers.

A surface of the negative electrode current collector 14A may be preferably roughened. This makes it possible to improve close-contact characteristics of the negative electrode active material layer 14B with respect to the negative electrode current collector 14A by a so-called anchor effect. In this case, it is enough that the surface of the negative electrode current collector 14A at least in a region facing the negative electrode active material layer 14A is roughened. Examples of the roughening method include a method of forming fine particles by utilizing electrolytic treatment. Through the electrolytic treatment, fine particles are formed on the surface of the negative electrode current collector 14A in an electrolytic bath by an electrolytic method to make the surface of the negative electrode current collector 14A rough. A copper foil fabricated by an electrolytic method is generally called "electrolytic copper foil."

The negative electrode active material layer 14B contains one or more of negative electrode materials capable of inserting and extracting lithium as a negative electrode active material. However, the negative electrode active material layer 14B may further contain one or more of materials such as a negative electrode binder and a negative electrode conductive agent. Details of the negative electrode binder and the negative electrode conductive agent are, for example, similar to those of the positive electrode binder and the positive electrode conductive agent.

However, the chargeable capacity of the negative electrode material is preferably larger than the discharge capacity of the positive electrode 13 for the purpose of preventing lithium metal from being unintentionally precipitated on the negative electrode 14 in the middle of charging. That is, the electrochemical equivalent of the negative electrode material capable of inserting and extracting lithium is preferably larger than the electrochemical equivalent of the positive electrode 13.

The negative electrode material is, for example, one or more of carbon materials. The carbon material causes an extremely-small change in a crystal structure thereof when lithium is inserted or extracted, which stably achieves high energy density. Further, the carbon material also serves as the negative electrode conductive agent, which improves conductivity of the negative electrode active material layer 22B.

Examples of the carbon material include graphitizable carbon, non-graphitizable carbon, and graphite. It is to be noted that a spacing of (002) plane in the non-graphitizable carbon is preferably not less than 0.37 nm, and a spacing of (002) plane in the graphite is preferably not more than 0.34 nm. More specific examples of the carbon material include pyrolytic carbons, cokes, glassy carbon fibers, an organic polymer compound fired body, activated carbon, and carbon blacks. Examples of the cokes include pitch coke, needle coke, and petroleum coke. The organic polymer compound fired body is a fired product obtained by firing (carbonizing) a polymer compound such as phenol resin and furan resin at appropriate temperature. Other than the materials mentioned above, the carbon material may be low crystalline carbon subjected to a heat treatment at temperature of about 1000° C. or lower, or may be amorphous carbon. The shape of the carbon material may be any of a fibrous shape, a spherical shape, a granular shape, and a scale-like shape.

Further, the negative electrode material is, for example, a material (metal-based material) containing one or more of metal elements and metalloid elements as constituent elements.

This is because a high energy density can be obtained.

The metal-based material may be a simple substance, an alloy, or a compound, may be two or more thereof, or may include one or more phases thereof in part or all thereof. It is to be noted that the alloy also encompasses a material that contains one or more metal elements and one or more metalloid elements, in addition to a material configured of two or more metal elements. Further, the alloy may contain a non-metallic element. Examples of the structure of the metal-based material include a solid solution, a eutectic crystal (a eutectic mixture), an intermetallic compound, and a structure in which two or more thereof coexist.

The metal elements and the metalloid elements described above are, for example, one or more of metal elements and metalloid elements that are able to form an alloy with lithium. Specific examples thereof include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

In particular, silicon or tin or both is preferable. The reason for this is that silicon and tin have a superior ability of inserting and extracting lithium, and therefore provide significantly high energy density.

A material that contains silicon, tin, or both as constituent elements may be any of a simple substance, an alloy, and a compound of silicon, may be any of a simple substance, an alloy, and a compound of tin, may be two or more thereof, or may be a material that includes one or more phases thereof at least in part. The "simple substance" described herein merely refers to a simple substance in a general sense (in which a small amount of impurity may be contained), and does not necessarily refer to a simple substance having a purity of 100%.

The alloy of silicon contains, for example, one or more of elements such as tin, nickel, copper, iron, cobalt, manganese, zinc, indium, silver, titanium, germanium, bismuth, antimony, and chromium, as constituent elements other than silicon. The compound of silicon contains, for example, one or more of elements such as carbon and oxygen as constituent elements other than silicon. The compound of silicon contains, for example, one or more of the elements described related to the alloy of silicon, as constituent elements other than silicon.

Specific examples of the alloy of silicon and the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0 < v \leq 2$, preferably $0 < v < 2$), and LiSiO. v in $SiO_v$ may be $0.2 < v < 1.4$.

The alloy of tin contains, for example, one or more of elements such as silicon, nickel, copper, iron, cobalt, manganese, zinc, indium, silver, titanium, germanium, bismuth, antimony, and chromium, as constituent elements other than tin. The compound of tin contains, for example, one or more of elements such as carbon and oxygen as constituent elements other than tin. The compound of tin contains, for example, one or more of the elements described related to the alloy of tin, as constituent elements other than tin.

Specific examples of the alloy of tin and the compound of tin include $SnO_w$ ($0 < w \leq 2$), $SnSiO_3$, LiSnO, and $Mg_2Sn$.

In particular, the material containing tin as a constituent element is preferably, for example, a material (Sn-containing material) that contains, together with tin as a first constituent element, a second constituent element and a third constituent element. The second constituent element includes, for example, one or more of elements such as cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. The third constituent element includes, for example, one or more of elements such as boron, carbon, aluminum, and phosphorus (P). This is because the Sn-containing material containing the second constituent element and the third constituent element makes it possible to achieve, for example, high battery capacity and superior cycle characteristics.

In particular, the Sn-containing material is preferably a material (a SnCoC-containing material) that contains tin, cobalt, and carbon as constituent elements. In the SnCoC-containing material, for example, a content of carbon is from 9.9% by mass to 29.7% by mass, and a ratio of contents of tin and cobalt (Co/(Sn+Co)) is from 20% by mass to 70% by mass. This is because a high energy density can be obtained.

The SnCoC-containing material preferably contains a phase that contains tin, cobalt, and carbon, and the phase is preferably low crystalline or amorphous. The phase is a phase (reaction phase) capable of reacting with lithium, and therefore existence of the reaction phase results in achievement of superior characteristics. Naturally, the reaction phase may include a low crystalline portion and an amorphous portion. A half width (a diffraction angle 2θ) of a diffraction peak obtained by X-ray diffraction of this reaction phase may be preferably 1° or larger in the case where a CuKα ray is used as a specific X-ray, and an insertion rate is 1°/min. This makes it possible to insert and extract lithium more smoothly in the SnCoC-containing material, and to decrease reactivity of the SnCoC-containing material with the electrolytic solution. In some cases, the SnCoC-containing material may include a phase that contains simple substances of the respective constituent elements or part thereof in addition to the low-crystalline phase or the amorphous phase.

For example, comparison between X-ray diffraction charts before and after an electrochemical reaction with lithium makes it possible to easily determine whether the diffraction peak obtained by the X-ray diffraction corresponds to the reaction phase that is able to react with lithium. Specifically, for example, if a position of the diffraction peak after the electrochemical reaction with lithium is changed from the position of the diffraction peak before the electrochemical reaction with lithium, the obtained diffraction peak corresponds to the reaction phase that is able to react with lithium. In this case, for example, the diffraction peak due to the low-crystalline reaction phase or the amorphous reaction phase is detected in a range of 2θ=20° to 50°. Such a reaction phase includes, for example, the respective constituent elements described above, and it is considered that such a reaction phase has become low crystalline or amorphous mainly because of existence of carbon.

In the SnCoC-containing material, part or all of carbon that is the constituent element thereof is preferably bound to a metal element or a metalloid element that is another constituent element thereof. This is because cohesion or crystallization of, for example, tin is suppressed. It is possible to confirm a binding state of the elements, for example, by an X-ray photoelectron spectroscopy method (XPS). In a commercially available device, for example, an Al—Kα ray or a Mg—Kα ray is used as a soft X-ray. In the case where part or all of carbon are bound to a metal element, a metalloid element, or the like, the peak of a synthetic wave of 1 s orbit of carbon (C1s) appears in a region lower than 284.5 eV. It is assumed that energy calibration is made so that the peak of 4f orbit of a gold atom (Au4f) is obtained at 84.0 eV. At this time, in general, since surface contamination carbon exists on the material surface, the peak of C1s of the surface contamination carbon is regarded as 284.8 eV, and this peak is used as energy standard. In XPS measurement, the waveform of the peak of C1s is obtained as a state including the peak of the surface contamination carbon and the peak of carbon in the SnCoC-containing material. The two peaks is therefore separated from each other, for example, by analysis with use of commercially-available software. In the analysis of the waveform, the position of the main peak existing on the lowest bound energy side is set to the energy reference (284.8 eV).

The SnCoC-containing material is not limited to the material (SnCoC) that contains only tin, cobalt, and carbon as constituent elements The SnCoC-containing material may further contain, for example, one or more of elements such as silicon, iron, nickel, chromium, indium, niobium, germanium, titanium, molybdenum, aluminum, phosphorus, gallium, and bismuth, as constituent elements, in addition to tin, cobalt, and carbon.

Other than the SnCoC-containing material, a material (a SnCoFeC-containing material) that contains tin, cobalt, iron, and carbon as constituent elements is also preferable. Any composition of the SnCoFeC-containing material may be adopted. To give an example, in the case where a content of iron is set smaller, a content of carbon is from 9.9% by mass to 29.7% by mass, a content of iron is from 0.3% by mass to 5.9% by mass, and a ratio of contents of tin and cobalt (Co/(Sn+Co)) is from 30% by mass to 70% by mass. Alternatively, in the case where the content of iron is set larger, the content of carbon is from 11.9% by mass to 29.7% by mass, the ratio of contents of tin, cobalt, and iron ((Co+Fe)/(Sn+Co+Fe)) is from 26.4% by mass to 48.5% by mass, and the ratio of contents of cobalt and iron (Co/(Co+Fe)) is from 9.9% by mass to 79.5% by mass. Such composition ranges allow for achievement of high energy density. Physical characteristics (such as a half width) of the SnCoFeC-containing material are similar to physical characteristics of the foregoing SnCoC-containing material.

Other than the materials mentioned above, the negative electrode material may be, for example, one or more of a metal oxide, a polymer compound, and the like. Examples of the metal oxide include iron oxide, ruthenium oxide, and molybdenum oxide. Examples of the polymer compound include polyacetylene, polyaniline, and polypyrrole.

In particular, the negative electrode material preferably contains both the carbon material and the metal-based material for the following reasons.

The metal-based material, in particular, the material containing one or both of silicon and tin as constituent elements has a concern that such a material is easily and radically expanded or contracted at the time of charge and discharge, whereas such a material has an advantage of high theoretical capacity. In contrast, the carbon material has an advantage that the carbon material is less prone to be expanded or contracted at the time of charge and discharge, whereas the carbon material has a concern of low theoretical capacity. Accordingly, using the carbon material and the metal-based material in combination makes it possible to suppress expansion and contraction during charging and discharging while achieving high theoretical capacity (in other words, high battery capacity).

The negative electrode active material layer 14B is formed by, for example, one or more of a coating method, a gas phase method, a liquid phase method, a spraying method, and a firing method (sintering method). The coating method is a method in which, for example, after a particulate (powder) negative electrode active material is mixed with a negative electrode binder and the like, the mixture is dispersed in an organic solvent or the like, and then the negative electrode current collector 14A is coated with the resultant. Examples of the gas phase method include a physical deposition method and a chemical deposition method. More specifically, examples thereof include vacuum evaporation method, sputtering method, ion plating method, laser ablation method, thermal chemical vapor deposition method, chemical vapor deposition (CVD) method, and plasma chemical vapor deposition method. Examples of the liquid phase method include electrolytic plating method and electroless plating method. The spraying method is a method in which a negative electrode active material in a fused state or a semi-fused state is sprayed onto the surface of the negative electrode current collector 14A. The firing method is, for example, a method in which after the negative electrode current collector 14A is coated with the mixture dispersed in the organic solvent or the like by the coating method, the mixture is subjected to heat treatment at a temperature higher than the melting point of the negative electrode binder or the like. Examples of the firing method include atmosphere firing method, reactive firing method, and hot press firing method.

In the secondary battery, as described above, the electrochemical equivalent of the negative electrode material capable of inserting and extracting lithium is larger than the electrochemical equivalent of the positive electrode for the purpose of preventing lithium from being unintentionally precipitated on the negative electrode 14 in the middle of charge. Further, in the case where an open circuit voltage (that is, a battery voltage) in a completely-charged state is not less than 4.25 V, an extraction amount of lithium per unit mass is larger than that in the case where the open circuit voltage in the completely-charged state is 4.20 V, even if the same positive electrode active material is used, and therefore, amounts of the positive electrode active material and the negative electrode active material are adjusted in accordance therewith. Accordingly, high energy density is obtained.

The separator 15 is disposed between the positive electrode 13 and the negative electrode 14. As a result, the positive electrode 13 and the negative electrode 14 are isolated with the separator 15 interposed therebetween. The separator 15 allows lithium ions to pass therethrough while preventing short circuit resulting from contact of the positive electrode 13 and the negative electrode 14.

The separator 15 contains, for example, one or more of porous films made of synthetic resin, ceramics, or the like. The separator 15 may be a laminated film in which two or more porous films are stacked. The synthetic resin includes, for example, one or more of elements such as polytetrafluoroethylene, polypropylene, and polyethylene.

The separator 15 may include, for example, the foregoing porous film (base material layer) and a polymer compound layer provided on the base material layer. The reason for this is that, this allows for an improvement in close-contact characteristics of the separator 15 with respect to each of the positive electrode 13 and the negative electrode 14, thereby suppressing deformation of the spirally wound electrode body 10. This makes it possible to suppress decomposition reaction of the electrolytic solution and to suppress liquid leakage of the electrolytic solution with which the base material layer is impregnated. Accordingly, electric resistance is less prone to increase even if charge and discharge are repeated, and swollenness of the secondary battery is suppressed.

The polymer compound layer may be provided on only one surface or both surfaces of the base material layer. The polymer compound layer includes, for example, one or more of polymer compounds such as polyvinylidene fluoride. This is because polyvinylidene fluoride has superior physical strength and is electrochemically stable. When the polymer compound layer is formed, for example, the base material layer is coated with a solution prepared by dissolving the polymer compound in, for example, an organic solvent, and thereafter, the base material layer is dried. Alternatively, the base material layer may be immersed in the solution, and thereafter the base material layer may be dried.

The electrolyte layer 16 includes an electrolytic solution and a polymer compound, and in the electrolyte layer 16, the electrolytic solution is held by the polymer compound. That is, the electrolyte layer 16 described here is a so-called gel electrolyte. The electrolyte layer 16 is used because high ion conductivity (for example, 1 mS/cm or higher at room temperature) is achieved, and, at the same time, liquid leakage of the electrolytic solution is prevented.

The polymer compound includes one or both of a first polymer compound and a second polymer compound. That is, the polymer compound may contain only the first polymer compound, may contain only the second polymer compound, or may contain both of the first and second polymer compounds.

The first polymer compound includes a first homopolymer and one or both of a second homopolymer and a second copolymer. That is, the first polymer compound may contain only the second homopolymer together with the first homopolymer, may contain only the second copolymer together with the first homopolymer, or may contain both the second homopolymer and the second copolymer together with the first homopolymer. Hereinafter, the second homopolymer and the second copolymer are collectively referred to as "second homopolymer or the like" as required.

The first homopolymer satisfies the following three conditions. First, the first homopolymer is a homopolymer containing no vinylidene fluoride as a component, and more specifically is a homopolymer obtained by a polymerization reaction using a monomer other than vinylidene fluoride. Second, the solubility parameter of the first homopolymer is 17 MPa$^{1/2}$ to 20 MPa$^{1/2}$. Third, the weight average molecular weight of the first homopolymer is not less than 100,000.

The type of the first homopolymer is not particularly limited as long as the first homopolymer is one or more of homopolymers satisfying the three conditions described above. Specific examples of the first homopolymer include polybutyl acrylate, polybutyl methacrylate, polystyrene, polyvinyl acetate, polyethyl methacrylate, polyether urethane, polyallyl acetate, and polymethyl acrylate.

The second homopolymer is a homopolymer containing vinylidene fluoride as a component and is so-called polyvinylidene fluoride. The solubility parameter of polyvinylidene fluoride is 23.2 MPa$^{1/2}$. The weight average molecular weight of the second homopolymer is not particularly limited.

The second copolymer is a copolymer containing vinylidene fluoride as a component and more specifically is a copolymer obtained by a polymerization reaction using two or more monomers containing vinylidene fluoride.

The polymerization mode of the second copolymer is not particularly limited. In other words, the polymerization mode of the second copolymer may be a random copolymer, a block copolymer, or another mode. The weight average molecular weight of the second copolymer is not particularly limited.

The type of monomer used together with vinylidene fluoride is not particularly limited as long as the monomer is one or more of polymerizable compounds other than the vinylidene fluoride. The "polymerizable compound" is a compound including one or more carbon-carbon double bonds (>C=C<) in order to be polymerizable. The type of the polymerizable compound is not particularly limited, and examples thereof include hexafluoropropylene, chlorotrifluoroethylene, tetrafluoroethylene, and monomethyl maleate. That is, the second copolymer contains, for example, one or more of hexafluoropropylene, chlorotrifluoroethylene, tetrafluoroethylene and monomethyl maleate as components, together with vinylidene fluoride.

The weight average molecular weight of the second copolymer is not particularly limited. The copolymerization amount of the polymerizable compound in the second copolymer is not particularly limited.

The polymer compound contains the first polymer compound (a combination of the first homopolymer and the second homopolymer and the like) because a sufficient amount of lithium ions are easy to move smoothly in the electrolyte layer 16.

Specifically, as will be described later, examples of candidates of a solvent contained in an electrolytic solution include cyclic carbonic acid ester and chain carbonic acid ester. The type of the cyclic carbonic acid ester is not particularly limited; however, cyclic carbonic acid ester is, for example, one or more of ethylene carbonate, propylene carbonate, and the like described below. The type of the chain carbonic acid ester is not particularly limited; however, chain carbonic acid ester is, for example, one or more of dimethyl carbonate, diethyl carbonate, ethylmethyl carbonate, and the like described below.

Here, since the second homopolymer or the like contains vinylidene fluoride as a component, the solubility parameter of the second homopolymer is generally larger than 20 MPa$^{1/2}$. Thus, since the second homopolymer or the like is easy to be dissolved or swollen with respect to the cyclic carbonic acid ester which is a high dielectric constant solvent (for example, relative dielectric constant ε>20) in the electrolyte layer 16, the cyclic carbonic acid ester is easy to be held. However, since the second homopolymer or the like is less likely to be dissolved or swollen with respect to the chain carbonic acid ester which is a low dielectric constant solvent (for example, relative dielectric constant ε≤20), the chain carbonic acid ester is less likely to be held.

From these facts, when the polymer compound contains only the second homopolymer or the like, the second homopolymer or the like is easy to hold the cyclic carbonic acid ester, whereas the chain carbonic acid ester is less likely to be held. Accordingly, when the polymer compound contains only the second homopolymer or the like, in order to ensure the retention property of the electrolytic solution due to the polymer compound, it is difficult to use a mixture of cyclic carbonic acid ester and chain carbonic acid ester as a solvent. Thus, it is difficult to utilize the advantages obtained when using a mixture of a high dielectric constant solvent (cyclic carbonic acid ester) and a low dielectric constant solvent (chain carbonic acid ester) as the solvent. Details of the advantages will be described later.

On the other hand, the solubility parameter of the first homopolymer containing no vinylidene fluoride as a component is 17 MPa$^{1/2}$ to 20 MPa$^{1/2}$ as described above. Moreover, the weight average molecular weight of the first homopolymer is a sufficiently large value and more specifically is not less than 100,000. Thus, since the first homopolymer is easy to be dissolved or swollen with respect to the chain carbonic acid ester which is a low dielectric constant solvent in the electrolyte layer 16, the chain carbonic acid ester is easy to be held. On the other hand, since the first homopolymer is less likely to be dissolved or swollen with respect to the cyclic carbonic acid ester which is a high dielectric constant solvent, the cyclic carbonic acid ester is less likely to be held.

From these facts, when the polymer compound contains only the first homopolymer, the first homopolymer is easy to hold the chain carbonic acid ester, whereas the cyclic carbonic acid ester is less likely to be held. Accordingly, similar to the case where the polymer compound contains only the second homopolymer or the like, in order to ensure the retention property of the electrolytic solution due to the polymer compound, it is difficult to use the mixture of cyclic carbonic acid ester and chain carbonic acid ester as the solvent. Thus, after all it is difficult to utilize the advantages obtained when using the mixture of the high dielectric constant solvent (cyclic carbonic acid ester) and the low dielectric constant solvent (chain carbonic acid ester) as the solvent.

Thus, when the polymer compound does not contain the first homopolymer and the second homopolymer or the like together, the amount of lithium ions moving in the electrolyte layer 16 does not sufficiently increase, and, at the same time, the lithium ions are less likely to move in the electrolyte layer 16.

On the other hand, when the polymer compound contains the first homopolymer and the second homopolymer or the like together, the first homopolymer easily holds chain carbonic acid ester in the electrolyte layer 16, and, at the same time, the second homopolymer or the like easily holds cyclic carbonic acid ester. Consequently, even when a mixture of cyclic carbonic acid ester and chain carbonic acid ester is used as the solvent, the retention property of the electrolytic solution due to the polymer compound is ensured. In addition, it is possible to utilize the advantages obtained when using the mixture of the high dielectric constant solvent (cyclic carbonic acid ester) and the low dielectric constant solvent (chain carbonic acid ester) as the solvent. Specifically, the cyclic carbonic acid ester which is a high dielectric constant solvent secures the dissolving ability of the electrolyte salt. Due to the chain carbonic acid ester which is a low dielectric constant solvent, the viscosity of the gel electrolyte layer 16 does not become too high (for example, viscosity ≤1 mPa·s), and therefore, the conductivity of lithium ions are improved.

Thus, when the polymer compound contains the first homopolymer and the second homopolymer or the like together, the amount of lithium ions moving in the electrolyte layer 16 sufficiently increases, and, at the same time, the lithium ions easily move in the electrolyte layer 16. As a result, as described above, a sufficient amount of lithium ions are easy to move smoothly in the electrolyte layer 16.

The mixing ratio of the first homopolymer and the second homopolymer or the like is not particularly limited. The reason for this is that if the polymer compound contains the first homopolymer and the second homopolymer or the like together, as compared to the case where the polymer compound does not contain the first homopolymer and the second homopolymer or the like together, the advantages described above can be obtained without depending on the mixing ratio.

The second polymer compound includes a third copolymer and one or both of a fourth homopolymer and a fourth copolymer. That is, the second polymer compound may contain only the fourth homopolymer together with the third copolymer, may contain only the fourth copolymer together with the third copolymer, or may contains both the fourth homopolymer and the fourth copolymer together with the third copolymer. Hereinafter, the fourth homopolymer and the fourth copolymer are collectively referred to as "fourth homopolymer and the like" as required.

The third copolymer satisfies the following two conditions. First, the third copolymer contains as components vinylidene fluoride and one or more of hexafluoropropylene, chlorotrifluoroethylene, tetrafluoroethylene and monomethyl maleate. That is, the third copolymer is a copolymer obtained by a polymerization reaction using a monomer containing vinylidene fluoride and one or more of hexafluoropropylene, chlorotrifluoroethylene, tetrafluoroethylene, and monomethyl maleate. Second, the copolymerization amount of one or more of hexafluoropropylene, chlorotrifluoroethylene, tetrafluoroethylene and monomethyl maleate in the third copolymer is not less than 15% by weight.

The polymerization mode of the third copolymer is not particularly limited. In other words, the polymerization mode of the third copolymer may be a random copolymer, a block copolymer, or another mode. The weight average molecular weight of the third copolymer is not particularly limited.

The fourth homopolymer is a homopolymer containing vinylidene fluoride as a component and is so-called polyvinylidene fluoride. The weight average molecular weight of the fourth homopolymer is not particularly limited.

The fourth copolymer satisfies the following two conditions. First, the fourth copolymer contains as components vinylidene fluoride and one or more of hexafluoropropylene, chlorotrifluoroethylene, tetrafluoroethylene and monomethyl maleate. That is, the fourth copolymer is a copolymer obtained by a polymerization reaction using a monomer containing vinylidene fluoride and one or more of hexafluoropropylene, chlorotrifluoroethylene, tetrafluoroethylene, and monomethyl maleate. Second, the copolymerization amount of one or more of hexafluoropropylene, chlorotrifluoroethylene, tetrafluoroethylene and monomethyl maleate in the fourth copolymer is less than 15% by weight.

The polymerization mode of the fourth copolymer is not particularly limited. In other words, the polymerization mode of the third copolymer may be a random copolymer, a block copolymer, or another mode.

Similar to the case where the polymer compound contains the first polymer compound (a combination of the second homopolymer and the second copolymer or the like), the polymer compound contains the second polymer compound (a combination of the third copolymer and the fourth homopolymer or the like) because a sufficient amount of lithium ions are easy to move smoothly in the electrolyte layer 16.

In this case, since the third copolymer having a relatively large copolymerization amount is easy to be dissolved or swollen with respect to the cyclic carbonic acid ester which is a high dielectric constant solvent, the cyclic carbonic acid ester is easy to be held. On the other hand, since the fourth homopolymer or the like having a relatively small copolymerization amount is easy to be dissolved or swollen with respect to the chain carbonic acid ester which is a low dielectric constant solvent, the chain carbonic acid ester is easy to be held. From these facts, when the polymer compound contains the third copolymer and the fourth homopolymer or the like together, the third homopolymer easily holds chain carbonic acid ester in the electrolyte layer 16, and, at the same time, the fourth homopolymer or the like easily holds cyclic carbonic acid ester. Consequently, even when the mixture of cyclic carbonic acid ester and chain carbonic acid ester is used as the solvent, the retention property of the electrolytic solution due to the polymer compound is ensured, and, at the same time, it is possible to utilize the advantages obtained when using the mixture of the high dielectric constant solvent (cyclic carbonic acid ester) and the low dielectric constant solvent (chain carbonic acid ester) as the solvent.

Thus, when the polymer compound contains the third copolymer and the fourth homopolymer or the like together, the amount of lithium ions moving in the electrolyte layer 16 sufficiently increases, and, at the same time, the lithium ions easily move in the electrolyte layer 16. As a result, as described above, a sufficient amount of lithium ions are easy to move smoothly in the electrolyte layer 16.

Naturally, the advantages described above are similarly obtained also in the case where the polymer compound contains the first polymer compound (a combination of the first homopolymer and the second homopolymer or the like) and the second polymer compound (a combination of the third copolymer and the fourth homopolymer or the like) together.

The mixing ratio of the third copolymer and the fourth homopolymer or the like is not particularly limited. The reason for this is that if the polymer compound contains the third copolymer and the fourth homopolymer or the like together, as compared to the case where the polymer compound does not contain the third copolymer and the fourth homopolymer or the like together, the advantages described above can be obtained without depending on the mixing ratio.

The polymer compound may contain one or more of other polymers together with one or both of the first polymer compound and the second polymer compound described above. Other polymers are polymers not corresponding to the first polymer compound and the second polymer compound described above, and may be a homopolymer or a copolymer.

Examples of the homopolymer include polyacrylonitrile, polyhexafluoropropylene, polychlorotrifluoroethylene, polytetrafluoroethylene, polyethylene oxide, polypropylene oxide, polyphosphazene, polysiloxane, polyvinyl fluoride, polyvinyl alcohol, polyacrylic acid, polymethacrylic acid, styrene-butadiene rubber, nitrile-butadiene rubber, and polycarbonate.

Examples of the copolymer include a copolymer containing vinylidene fluoride and monomethyl maleate as components.

The electrolytic solution contains a solvent and an electrolyte salt. However, the electrolytic solution may further contain one or more of other materials such as additives.

The solvent contains one or more of nonaqueous solvents such as organic solvents. The electrolytic solution containing the nonaqueous solvent is a so-called nonaqueous electrolytic solution.

Examples of the nonaqueous solvent include carbonate esters (cyclic carbonate ester and chain carbonate ester), lactone, a chain carboxylic ester, and nitrile. The nonaqueous solvents make it possible to achieve, for example, superior battery capacity, superior cycle characteristics, and superior storage characteristics.

Examples of the cyclic carbonate ester include ethylene carbonate, propylene carbonate, and butylene carbonate. Examples of the chain carbonate ester include dimethyl carbonate, diethyl carbonate, ethylmethyl carbonate, and methylpropyl carbonate. Examples of the lactone include γ-butyrolactone and γ-valerolactone. Examples of the carboxylic ester include methyl acetate, ethyl acetate, methyl propionate, ethyl propionate, methyl butyrate, methyl isobutyrate, methyl trimethylacetate, and ethyl trimethylacetate. Examples of the nitrile include acetonitrile, glutaronitrile, adiponitrile, methoxyacetonitrile, and 3-methoxypropionitrile.

Other than the materials mentioned above, examples of the nonaqueous solvent include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. These nonaqueous solvents make it possible to achieve similar advantages.

In particular, the nonaqueous solvent preferably contains a chain carbonate ester. As described above, this is because, since the polymer compound contained in the electrolyte layer 16 includes one or both of the first polymer compound and the second polymer compound, the low dielectric constant solvent (chain carbonic acid ester) is easily held by the polymer compound in the electrolyte layer 16.

In this case, the nonaqueous solvent preferably contains a cyclic carbonate ester together with the chain carbonate ester. As described above, this is because both the low dielectric constant solvent (chain carbonic acid ester) and the high dielectric constant solvent (cyclic carbonic acid ester) are easily held by the polymer compound in the electrolyte layer 16.

When the nonaqueous solvent contains cyclic carbonic acid ester which is a high dielectric constant solvent and chain carbonic acid ester which is a low dielectric constant solvent, the mixing ratio of the cyclic carbonic acid ester and the chain carbonic acid ester is not particularly limited. In particular, the content of the chain carbonic acid ester in the nonaqueous solvent is preferably 10% by weight to 90% by weight. This is because, since the mixing ratio of the cyclic carbonic acid ester and the chain carbonic acid ester is optimized, the advantages described above, namely, the advantages obtained when using the mixture of the high dielectric constant solvent (cyclic carbonic acid ester) and the low dielectric constant solvent (chain carbonic acid ester) as the solvent are effectively utilized.

In particular, the solvent may contain one or more of an unsaturated cyclic carbonate ester, a halogenated carbonate ester, a sulfonate ester, an acid anhydride, a dicyano compound (dinitrile compound), a diisocyanate compound, a phosphoric ester, a chain compound having a carbon-carbon triple bond, and the like. This makes it possible to improve the chemical stability of the electrolytic solution.

The unsaturated cyclic carbonate ester is a cyclic carbonate ester including one or more unsaturated bonds (carbon-carbon double bonds or carbon-carbon triple bonds). Examples of the unsaturated cyclic carbonate ester include vinylene carbonate, vinyl ethylene carbonate, and methylene ethylene carbonate. A content of the unsaturated cyclic carbonate ester in the solvent is not particularly limited; however, the content is, for example, from 0.01% by weight to 10% by weight.

The halogenated carbonate ester is a cyclic carbonate ester having one or more halogens as constituent elements or a chain carbonate ester having one or more halogens as constituent elements. Examples of the cyclic halogenated carbonate ester include 4-fluoro-1,3-dioxolan-2-one and 4,5-difluoro-1,3-dioxolan-2-one. Examples of the chain halogenated carbonate ester include fluoromethyl methyl carbonate, bis(fluoromethyl) carbonate, and difluoromethyl methyl carbonate. A content of the halogenated carbonate ester in the solvent is not particularly limited; however, the content is, for example, from 0.01% by weight to 50% by weight.

Examples of the sulfonate ester include 1,3-propane sultone and 1,3-propene sultone. A content of the sulfonate ester in the solvent is not particularly limited; however, the content is, for example, from 0.5% by weight to 5% by weight.

Examples of the acid anhydride include carboxylic anhydride, disulfonic anhydride, and carboxylic-sulfonic anhydride. Examples of the carboxylic anhydride include succinic anhydride, glutaric anhydride, and maleic anhydride. Examples of the disulfonic anhydride include ethanedisulfonic anhydride and propanedisulfonic anhydride. Examples of the carboxylic-sulfonic anhydride include sulfobenzoic anhydride, sulfopropionic anhydride, and sulfobutyric anhydride. A content of the acid anhydride in the solvent is not particularly limited; however, the content is, for example, from 0.5% by weight to 5% by weight.

Examples of the dinitrile compound include a compound represented by $NC-C_mH_{2m}-CN$ (m is an integer of not less than 1). Examples of the dinitrile compound include succinonitrile ($NC-C_2H_4-CN$), glutaronitrile ($NC-C_3H_6-CN$), adiponitrile ($NC-C_4H_8-CN$), and phthalonitrile ($NC-C_6H_4-CN$). A content of the dinitrile compound in the solvent is not particularly limited; however, the content is, for example, from 0.5% by weight to 5% by weight.

Examples of the diisocyanate compound include a compound represented by $OCN-C_nH_{2n}-NCO$ (n is an integer of not less than 1). Examples of the diisocyanate compound include hexamethylene diisocyanate ($OCN-C_6H_{12}-NCO$). A content of the diisocyanate compound in the solvent is not particularly limited; however, the content is, for example, from 0.5% by weight to 5% by weight.

Examples of the phosphoric ester include trimethyl phosphate and triethyl phosphate. A content of the phosphoric ester in the solvent is not particularly limited; however, the content is, for example, from 0.5% by weight to 5% by weight.

The chain compound having a carbon-carbon triple bond is a chain compound having one or more carbon-carbon triple bonds (—C≡C—). Examples of the chain compound having a carbon-carbon triple bond include propargyl methyl carbonate (CH≡C—CH$_2$—O—C(=O)—O—CH$_3$) and propargyl methyl sulfonate (CH≡C—CH$_2$—O—S(=O)$_2$—CH$_3$). A content of the chain compound having the carbon-carbon triple bond in the solvent is not particularly limited; however, the content is, for example, from 0.5% by weight to 5% by weight.

The electrolyte salt contains, for example, one or more of salts such as lithium salts. However, the electrolyte salt may contain a salt other than the lithium salt. Examples of the salt other than the lithium salt include a light metal salt other than lithium.

Examples of the lithium salts include lithium hexafluorophosphate (LiPF$_6$), lithium tetrafluoroborate (LiBF$_4$), lithium perchlorate (LiClO$_4$), lithium hexafluoroarsenate (LiAsF$_6$), lithium tetraphenylborate (LiB(C$_6$H$_5$)$_4$), lithium methanesulfonate (LiCH$_3$SO$_3$), lithium trifluoromethane sulfonate (LiCF$_3$SO$_3$), lithium tetrachloroaluminate (LiAlCl$_4$), dilithium hexafluorosilicate (Li$_2$SiF$_6$), lithium chloride (LiCl), and lithium bromide (LiBr). The nonaqueous solvents make it possible to achieve, for example, superior battery capacity, superior cycle characteristics, and superior storage characteristics.

In particular, one or more of lithium hexafluorophosphate, lithium tetrafluoroborate, lithium perchlorate, and lithium hexafluoroarsenate are preferable, and lithium hexafluorophosphate is more preferable. These lithium salts make it possible to lower internal resistance, thereby achieving a higher effect.

A content of the electrolyte salt is not particularly limited; however, the content is preferably from 0.3 mol/kg to 3.0 mol/kg with respect to the solvent. High ion conductivity is achievable in this range.

The electrolyte layer 16 may further include one or more of other materials according to an embodiment of the present disclosure.

The other materials include, for example, one or more of a plurality of inorganic particles. The plurality of inorganic particles mainly play a role of improving the safety of the secondary battery. Specifically, when the electrolyte layer 16 includes the plurality of inorganic particles, the separator 15 is less likely to be oxidized during charging and discharging of the secondary battery. Accordingly, short circuit tends not to occur between the positive electrode 13 and the negative electrode 14, so that the safety of the secondary battery is improved.

The kind of the plurality of inorganic particles is not particularly limited. Specifically, the plurality of inorganic particles contain, for example, one or more of inorganic materials such as a ceramic (insulating material). Examples of the ceramic include aluminum oxide (Al$_2$O$_3$), zirconium oxide (ZrO$_2$), titanium oxide (TiO$_2$), and magnesium oxide (MgO$_2$). This is because oxidation of the separator 15 is sufficiently suppressed, so that occurrence of short circuit is sufficiently suppressed.

The average particle diameter (median diameter D50) and specific surface area (BET specific surface area) of the plurality of inorganic particles are not particularly limited. Specifically, the average particle diameter is, for example, 0.1 μm to 2.5 μm. The specific surface area is, for example, 0.5 m$^2$/g to 11 m$^2$/g.

A content of the plurality of inorganic particles in the electrolyte layer 16 is not particularly limited and can be arbitrarily set.

The secondary battery operates, for example, as follows.

During charging, when lithium ions are extracted from the positive electrode 13, the lithium ions are inserted in the negative electrode 14 through the electrolyte layer 16. On the other hand, during discharging, when lithium ions are extracted from the negative electrode 14, the lithium ions are inserted in the positive electrode 13 through the electrolyte layer 16.

The secondary battery including the electrolyte layer 16 is manufactured, for example, by one of the following three procedures.

First, the positive electrode 13 is fabricated, and the negative electrode 14 is fabricated.

When fabricating the positive electrode 13, first, the positive electrode active material is mixed with the positive electrode binder, the positive electrode conductive agent, and the like to obtain a positive electrode mixture. Subsequently, the positive electrode mixture is dispersed or dissolved in, for example, an organic solvent to obtain a paste-like positive electrode mixture slurry. Finally, both surfaces of the positive electrode current collector 13A are coated with the positive electrode mixture slurry, and thereafter, the coated positive electrode mixture slurry is dried to form the positive electrode active material layer 13B. Thereafter, the positive electrode active material layer 13B may be compression-molded with use of, for example, a roll pressing machine. In this case, the compression molding processing may be performed while heating the positive electrode active material layer 13B, or the compression molding processing may be repeated a plurality of times.

When fabricating the negative electrode 14, the negative electrode active material layers 14B are formed on both surfaces of the negative electrode current collector 14A by the production procedure that is the same as in the positive electrode 13. Specifically, a negative electrode mixture in which the negative electrode active material, the negative electrode binder, and the negative electrode conductive agent are mixed is dispersed or dissolved in, for example, an organic solvent to obtain a paste-like negative electrode mixture slurry. Subsequently, the negative electrode mixture slurry is coated on both surfaces of the negative electrode current collector 14A and then dried to form the negative electrode active material layer 14B, and then, if necessary, the negative electrode active material layer 14B is compression-molded with use of, for example, a roll pressing machine.

Subsequently, the electrolyte salt is added to a solvent to prepare an electrolytic solution. Subsequently, after an electrolytic solution, a polymer compound, optionally a plurality of inorganic particles, a diluting solvent (for example, an organic solvent) and the like are mixed, the mixture is stirred, whereby a sol precursor solution is prepared.

When the precursor solution is prepared, for example, two or more preparatory liquids prepared by dissolving different types of polymer compounds in a solvent (for example, an organic solvent) are provided, and after the two or more preparatory liquids are mixed, the electrolyte salt may be added to the mixed liquid.

Subsequently, after the surface of the positive electrode 13 is coated with the precursor solution, the coated precursor solution is dried to form the gel electrolyte layer 16. On the other hand, the surface of the negative electrode 14 is coated with the precursor solution, and the coated precursor solution is dried to form the gel electrolyte layer 16. Subsequently, the positive electrode lead 11 is attached to the positive electrode current collector 13A by, for example, a welding method, and the negative electrode lead 12 is attached to the negative electrode current collector 14A by, for example, a welding method. Subsequently, the positive electrode 13 and the negative electrode 14 stacked with the separator 15 and the electrolyte layer 16 interposed therebetween are spirally wound to fabricate the spirally wound electrode body 10. Subsequently, the protective tape 17 is attached onto the outermost periphery of the spirally wound electrode body 10. Subsequently, the outer package member 20 is folded to interpose the spirally wound electrode body 10, and thereafter, the outer edges of the outer package member 20 are bonded by, for example, a thermal fusion bonding method to enclose the spirally wound electrode body 10 in the outer package member 20. In this case, the close-contact film 21 is inserted between the positive electrode lead 11 and the outer package member 20, and the close-contact film 21 is inserted between the negative electrode lead 12 and the outer package member 20.

After the positive electrode 13 and the negative electrode 14 are fabricated by the same procedure as the first procedure described above, the positive electrode lead 11 is attached to the positive electrode 13, and the negative electrode lead 12 is attached to the negative electrode 14. Subsequently, the positive electrode 13 and the negative electrode 14 stacked with the separator 15 interposed therebetween are spirally wound to fabricate a spirally wound body as a precursor of the spirally wound electrode body 10. Subsequently, the protective tape 17 is attached onto the outermost periphery. Subsequently, the outer package member 20 is folded to interpose the spirally wound body, and thereafter, the outer edges of the outer package member 20 are bonded by, for example, a thermal fusion bonding method to store the spirally wound body in the outer package member 20. Subsequently, the electrolytic solution, raw materials of the polymer compound, a polymerization initiator, and, as necessary, other materials such as a plurality of inorganic particles and a polymerization inhibitor are mixed to prepare a composition for electrolyte. Subsequently, the composition for electrolyte is injected into the pouch-like outer package member 20, and thereafter, the pouch-like outer package member 20 is hermetically sealed by, for example, a thermal fusion bonding method. Subsequently, a polymer compound is formed by thermally polymerizing the raw material of the polymer compound. Accordingly, the polymer compound is impregnated with the electrolytic solution, and the polymer compound is gelated, thus forming the electrolyte layer 16.

A spirally wound body is fabricated by the same procedure as in the foregoing second procedure, and is then contained inside the pouch-like outer package member 20, except that the separator 15 having on its both sides the polymer compound layers is used. When the polymer compound layer is formed, a solution prepared by dissolving the polymer compound in an organic solvent or the like is applied to both surfaces of the separator 15, and then the solution is dried. Subsequently, the electrolytic solution is injected into the outer package member 20, and thereafter, a cavity of the outer package member 20 is hermetically sealed by, for example, a thermal fusion bonding method. Subsequently, the outer package member 20 is heated while a weight is applied to the outer package member 20 to bring the separator 15 into close contact with the positive electrode 13 and the negative electrode 14 with the polymer compound layer interposed therebetween. Accordingly, the polymer compound in the polymer compound layer is impregnated with the electrolytic solution, and the polymer compound is gelated, thus forming the electrolyte layer 16.

In the third procedure, swollenness of the secondary battery is suppressed as compared with the first procedure. Further, in the third procedure, a monomer, a solvent, or the like as the raw material of the polymer compound is hardly left in the electrolyte layer 16, as compared with the second procedure, and therefore, the formation process of the polymer compound is favorably controlled. Thus, the positive electrode 13, the negative electrode 14, the separator 15, and the electrolyte layer 16 are in sufficiently close contact with each other.

According to the secondary battery, the polymer compound contained in the electrolyte layer 16 contains one or both of the first polymer compound (a combination of the first homopolymer and the second homopolymer or the like) and the second polymer compound (a combination of the third copolymer and the fourth homopolymer or the like). In this case, as described above, as compared to the case where the polymer compound does not include one or both of the first polymer compound and the second polymer compound, a sufficient amount of lithium ions are easy to move smoothly in the electrolyte layer 16. Thus, excellent battery characteristics can be obtained.

In particular, if the first homopolymer contains butyl polyacrylate or the like, the homopolymer thereof is sufficiently easy to hold the low dielectric constant solvent (chain carbonic acid ester), so that higher effects can be obtained. If the second copolymer contains hexafluoropropylene or the like as a component, the second copolymer is sufficiently easy to hold the high dielectric constant solvent (cyclic carbonic acid ester), so that higher effects can be obtained.

If the solvent contained in the electrolytic solution contains a chain carbonic acid ester such as dimethyl carbonate, the low dielectric constant solvent (chain carbonic acid ester) is easily held by the first homopolymer and the third copolymer, so that higher effects can be obtained. In this case, if the solvent further contains a cyclic carbonic acid ester such as ethylene carbonate, the advantages obtained when using the mixture of the high dielectric constant solvent (cyclic carbonic acid ester) and the low dielectric constant solvent (chain carbonic acid ester) are effectively utilized, so that higher effects can be obtained. In particular, in the case where the solvent contains chain carbonic acid ester and cyclic carbonic acid ester, if the content of the chain carbonic acid ester in the solvent is 10% by weight to 90% by weight, the advantages described above are more effectively utilized, so that a remarkably high effect can be obtained.

Next, description is given on application examples of the foregoing secondary battery.

Applications of a secondary battery are not particularly limited as long as the secondary battery is applied to a machine, a device, an appliance, an apparatus, a system (collective entity of a plurality of devices and the like), or the like that is capable of using the secondary battery as a driving electric power source, an electric power storage source for electric power accumulation, or the like. The secondary battery used as an electric power source may be a main electric power source, or may be an auxiliary electric power source. The main electric power source is an electric power source used preferentially regardless of the presence or absence of other power sources. The auxiliary electric power source may be, for example, an electric power source used instead of the main electric power source or an electric power source used by being switched from the main electric power source as necessary. When the secondary battery is used as the auxiliary electric power source, the kind of the main electric power source is not limited to the secondary battery.

Examples of applications of the secondary battery include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof include a mobile lifestyle electric appliance such as an electric shaver; a storage device such as a backup electric power source and a memory card; an electric power tool such as an electric drill and an electric saw; a battery pack used as an attachable and detachable electric power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for an application other than the applications described above.

In particular, the secondary battery is effectively applicable to the battery pack, the electric vehicle, the electric power storage system, the electric power tool, the electronic apparatus, or the like. The reason for this is that since superior battery characteristics are demanded in these applications, performance can be effectively improved with use of the secondary battery of the present technology. The battery pack is an electric power source including the secondary battery. As will be described later, the battery pack may include a single battery or an assembled battery. The electric vehicle is a vehicle that works (runs) with use of the secondary battery as a driving electric power source, and as described above, the electric vehicle may be an automobile (such as a hybrid automobile) including a drive source other than the secondary battery. The electric power storage system is a system including the secondary battery as an electric power storage source. For example, in a home electric power storage system, electric power is accumulated in the secondary battery as an electric power storage source, and therefore, home electric products and the like can be used using the electric power. The electric power tool is a tool in which a movable section (such as a drill) is allowed to move with use of the secondary battery as a driving electric power source. The electronic apparatus is an apparatus executing various functions with use of the secondary battery as a driving electric power source (electric power supply source).

Herein, specific description is given on some application examples of the secondary battery. The configurations of the application examples explained below are merely examples, and may be changed as appropriate.

Figure 3:
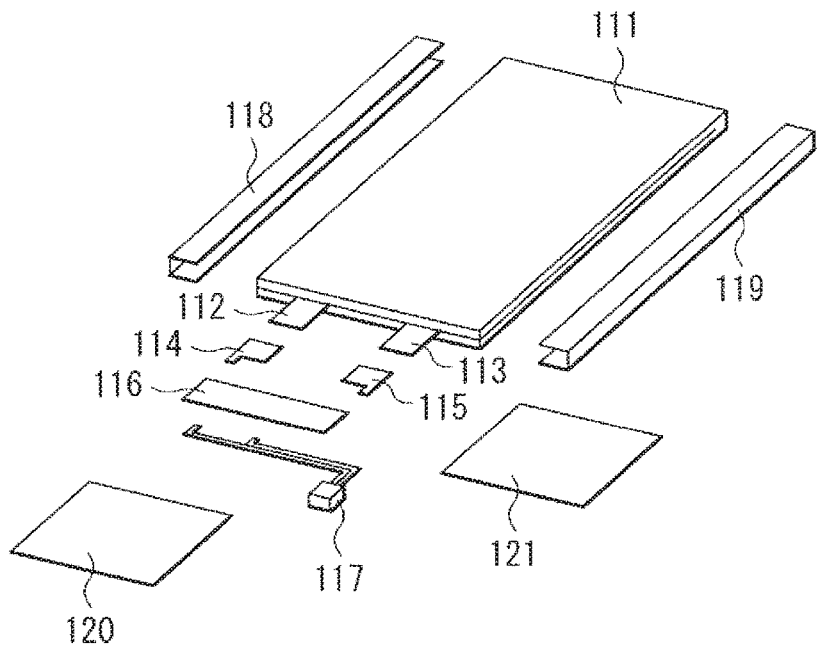
FIG. 3 is a perspective view illustrating a configuration of an application example (a battery pack: single battery) of the secondary battery according to an embodiment of the present technology.
Figure 4:
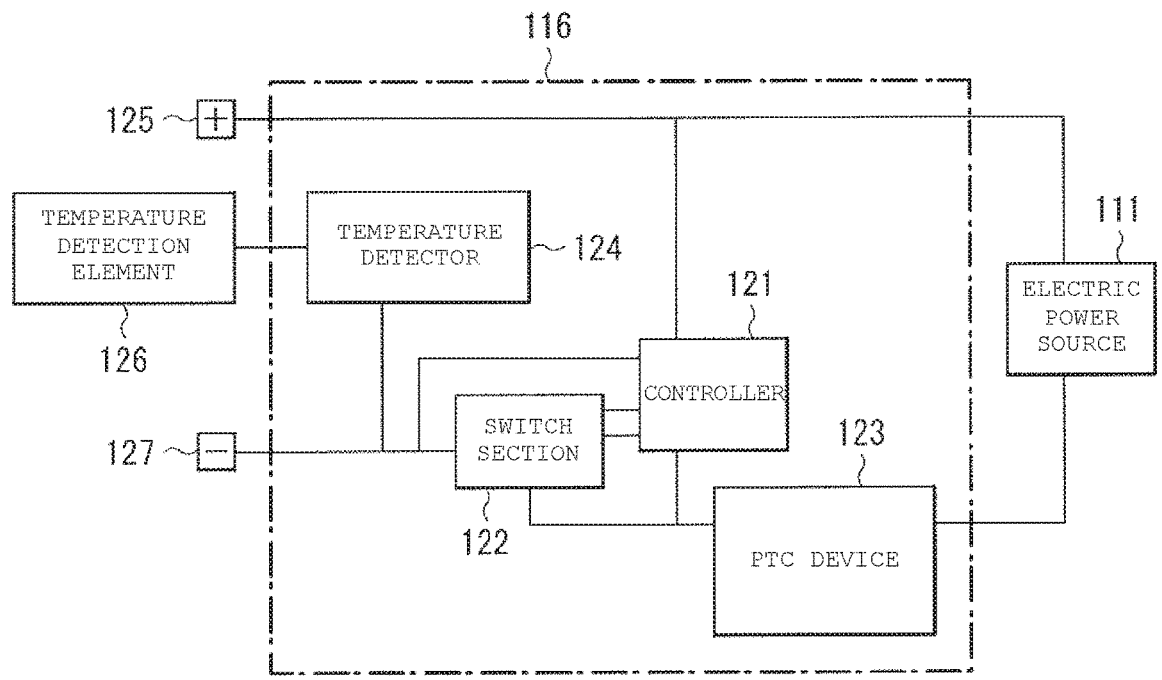
FIG. 4 is a block diagram illustrating a configuration of the battery pack illustrated in FIG. 3.

FIG. 3 illustrates a perspective configuration of a battery pack including a single battery. FIG. 4 illustrates a block configuration of the battery pack shown in FIG. 3. FIG. 3 illustrates a state that the battery pack is disassembled.

The battery pack described herein is a simple battery pack including the secondary battery of the present technology (a so-called soft pack), and is mounted in, for example, an electronic apparatus typified by a smartphone. For example, the battery pack includes an electric power source 111 that is a laminated-film-type secondary battery, and a circuit board 116 coupled to the electric power source 111, as illustrated in FIG. 3. A positive electrode lead 112 and a negative electrode lead 113 are attached to the electric power source 111.

A pair of adhesive tapes 118 and 119 is attached to both side surfaces of the electric power source 111. A protection circuit module (PCM) is formed on the circuit board 116. The circuit board 116 is coupled to the positive electrode 112 through a tab 114, and is coupled to a negative electrode lead 113 through a tab 115. Moreover, the circuit board 116 is coupled to a lead 117 provided with a connector for external connection. While the circuit board 116 is coupled to the electric power source 111, the circuit board 116 is protected by a label 120 and an insulating sheet 121. The label 120 is attached to fix, for example, the circuit board 116 and the insulating sheet 121.

Moreover, for example, the battery pack includes the electric power source 111 and the circuit board 116 as illustrated in FIG. 4. The circuit board 116 includes, for example, a controller 121, a switch section 122, a PTC device 123, and a temperature detector 124. The electric power source 111 is allowed to be coupled to outside through a positive electrode terminal 125 and a negative electrode terminal 127, so that the electric power source 111 is charged and discharged through the positive electrode terminal 125 and the negative electrode terminal 127. The temperature detector 124 detects a temperature with use of a temperature detection terminal (a so-called T terminal) 126.

The controller 121 controls an operation of the entire battery pack (including a used state of the electric power source 111). The controller 121 includes, for example, a central processing unit (CPU) or a processor, and a memory.

For example, in the case where a battery voltage reaches an overcharge detection voltage, the controller 121 causes the switch section 122 to be disconnected so that a charge current does not flow into a current path of the electric power source 111. Moreover, for example, in the case where a large current flows during charging, the controller 121 causes the switch section 122 to be disconnected, thereby blocking the charge current.

On the other hand, for example, in the case where a battery voltage reaches an overdischarge detection voltage, the controller 121 causes the switch section 122 to be disconnected so that a discharge current does not flow into a current path of the electric power source 111. Moreover, for example, in the case where a large current flows during discharging, the controller 121 causes the switch section 122 to be disconnected, thereby blocking the discharge current.

The overcharge detection voltage is, for example, 4.2 V±0.05 V, and the overdischarge detection voltage is, for example, 2.4 V±0.1 V.

The switch section 122 switches the used state of the electric power source 111, that is, whether or not the electric power source 111 is allowed to be coupled to an external device in accordance with an instruction from the controller 121. The switch section 122 includes, for example, a charge control switch and a discharge control switch. The charge control switch and the discharge control switch are each, for example, a semiconductor switch such as a field-effect transistor (MOSFET) using a metal oxide semiconductor. Charge and discharge currents are, for example, detected based on on-resistance of the switch section 122.

The temperature detector 124 measures a temperature of the electric power source 111, and outputs a measurement result of the temperature to the controller 121. The temperature detector 124 includes, for example, a temperature detection element such as a thermistor. The measurement result of the temperature measured by the temperature detector 124 is used, for example, in the case where the controller 121 performs charge and discharge control at the time of abnormal heat generation and in the case where the controller 121 performs a correction process at the time of calculating remaining capacity.

The circuit board 116 may not include the PTC device 123. In this case, a PTC device may be separately attached to the circuit board 116.

Figure 5:
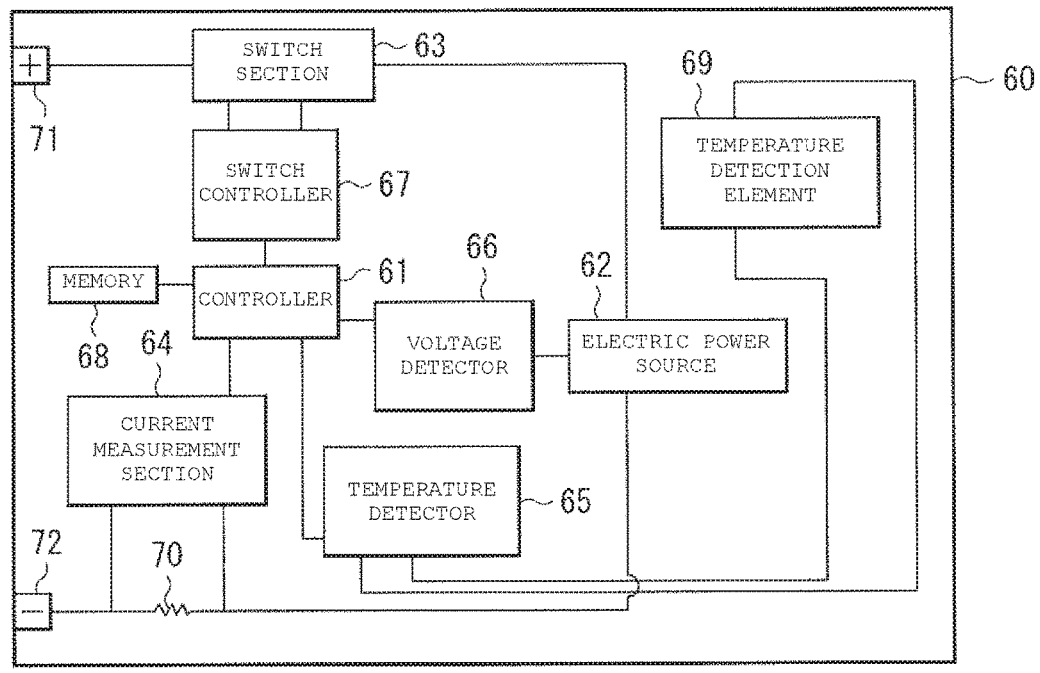
FIG. 5 is a block diagram illustrating a configuration of an application example (a battery pack: assembled battery) of the secondary battery according to an embodiment of the present technology.

FIG. 5 illustrates a block configuration of a battery pack including an assembled battery.

For example, the battery pack includes a controller 61, an electric power source 62, a switch section 63, a current measurement section 64, a temperature detector 65, a voltage detector 66, a switch controller 67, a memory 68, a temperature detection element 69, a current detection resistance 70, a positive electrode terminal 71, and a negative electrode terminal 72 in a housing 60. The housing 60 contains, for example, a plastic material.

The controller 61 controls an operation of the entire battery pack (including a used state of the electric power source 62). The controller 61 includes, for example, a CPU. The electric power source 62 is an assembled battery including two or more secondary batteries of the present technology, and the two or more secondary batteries may be connected in series, in parallel, or in series-parallel combination. As an example, the electric power source 62 includes six secondary batteries in which two sets of series-connected three batteries are connected in parallel to each other.

The switch section 63 switches the used state of the electric power source 62, that is, whether or not the electric power source 62 is allowed to be coupled to an external device, in accordance with an instruction of the controller 61. The switch section 63 includes, for example, a charge control switch, a discharge control switch, a charging diode, and a discharging diode. The charge control switch and the discharge control switch are each, for example, a semiconductor switch such as a field-effect transistor (MOSFET) using a metal oxide semiconductor.

The current measurement section 64 measures a current with use of the current detection resistance 70, and outputs a measurement result of the current to the controller 61. The temperature detector 65 measures temperature with use of the temperature detection element 69, and outputs a measurement result of the temperature to the controller 61. The measurement result of the temperature is used, for example, in the case where the controller 61 performs charge and discharge control at the time of abnormal heat generation and in the case where the controller 61 performs a correction process at the time of calculating remaining capacity. The voltage detector 66 measures a voltage of the secondary battery in the electric power source 62, performs analog-to-digital conversion on the measured voltages, and supplies the resultant to the controller 61.

The switch controller 67 controls an operation of the switch section 63 in accordance with signals input respectively from the current measurement section 64 and the voltage detector 66.

For example, in the case where a battery voltage reaches an overcharge detection voltage, the switch controller 67 causes the switch section 63 (charge control switch) to be disconnected so that a charge current does not flow into a current path of the electric power source 62. This makes it possible to perform only discharge through the discharging diode in the electric power source 62. For example, when a large current flows during charging, the switch controller 67 blocks the charging current.

For example, in the case where a battery voltage reaches an overdischarge detection voltage, the switch controller 67 causes the switch section 63 (discharge control switch) to be disconnected so that a discharge current does not flow into a current path of the electric power source 62. This makes it possible to perform only charge through the charging diode in the electric power source 62. For example, when a large current flows during discharging, the switch controller 67 blocks the discharging current.

The overcharge detection voltage is, for example, 4.2 V±0.05 V, and the overdischarge detection voltage is, for example, 2.4 V±0.1 V.

The memory 68 includes, for example, an EEPROM as a non-volatile memory. The memory 68 holds, for example, numerical values calculated by the controller 61 and information of the secondary battery measured in a manufacturing process (such as an internal resistance in an initial state). In the case where the memory 68 holds full charge capacity of the secondary battery, the controller 61 is allowed to comprehend information such as remaining capacity.

The temperature detection element 69 measures a temperature of the electric power source 62, and outputs a measurement result of the temperature to the controller 61. The temperature detection element 69 includes, for example, a thermistor.

The positive electrode terminal 71 and the negative electrode terminal 72 are terminals coupled to an external device (such as a notebook personal computer) driven using the battery pack or an external device (such as a battery charger) used for charging the battery pack. The electric power source 62 is charged and discharged through the positive electrode terminal 71 and the negative electrode terminal 72.

Figure 6:
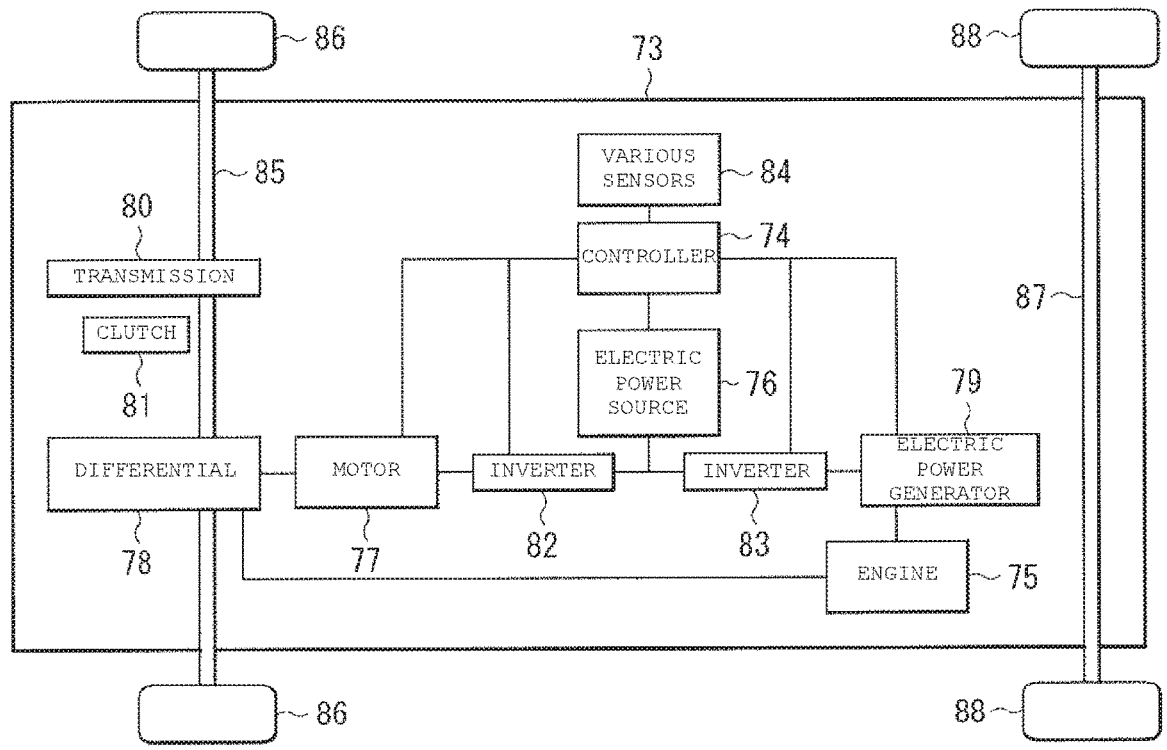
FIG. 6 is a block diagram illustrating a configuration of an application example (an electric vehicle) of the secondary battery according to an embodiment of the present technology.

FIG. 6 illustrates a block configuration of a hybrid automobile as an example of an electric vehicle.

For example, the electric vehicle includes a controller 74, an engine 75, an electric power source 76, a driving motor 77, a differential 78, an electric power generator 79, a transmission 80, a clutch 81, inverters 82 and 83, and various sensors 84 inside a housing 73 made of metal. Other than the components mentioned above, the electric vehicle includes, for example, a front drive shaft 85 and a front tire 86 that are coupled to the differential 78 and the transmission 80, and a rear drive shaft 87, and a rear tire 88.

The electric vehicle can be run with use of one of the engine 75 and the motor 77 as a drive source, for example. The engine 75 is a main power source, and is, for example, a petrol engine. In the case where the engine 75 is used as a power source, drive power (torque) of the engine 75 is transferred to the front tire 86 or the rear tire 88 through the differential 78, the transmission 80, and the clutch 81 as drive sections, for example. Since the torque of the engine 75 is transferred to the electric power generator 79, the electric power generator 79 generates alternating-current electric power with use of the torque, and since the alternating-current electric power is converted into direct-current electric power through the inverter 83, the direct-current electric power is accumulated in the electric power source 76. In contrast, in the case where the motor 77 as a conversion section is used as a power source, electric power (direct-current electric power) supplied from the electric power source 76 is converted into alternating-current electric power through the inverter 82, and therefore, the motor 77 is driven with use of the alternating-current electric power. Drive power (torque) obtained by converting the electric power by the motor 77 is transferred to the front tire 86 and the rear tire 88 through the differential 78, the transmission 80, and the clutch 81 as the drive sections, for example.

When speed of the electric vehicle is reduced by a brake mechanism, resistance at the time of speed reduction is transferred to the motor 77 as torque, and thus the motor 77 may generate alternating-current electric power by utilizing the torque. It is preferable that the alternating-current electric power be converted into direct-current electric power through the inverter 82, and thus the direct-current regenerative electric power be accumulated in the electric power source 76.

The controller 74 controls an operation of the entire electric vehicle. The controller 74 includes, for example, a CPU or a processor. The electric power source 76 includes one or more secondary batteries of the present technology. The electric power source 76 is coupled to an external power source, and the power source 76 is allowed to accumulate electric power by receiving electric power supply from the external electric power source. The various sensors 84 are used, for example, for controlling the number of revolutions of the engine 75 and for controlling opening level (throttle opening level) of a throttle valve. The various sensors 84 include, for example, one or more of a speed sensor, an acceleration sensor, and an engine frequency sensor.

The description has been given above on a case where the electric vehicle is the hybrid automobile; however, the electric vehicle may be a vehicle (an electric automobile) that works with use of only the electric power source 76 and the motor 77 without using the engine 75.

Figure 7:
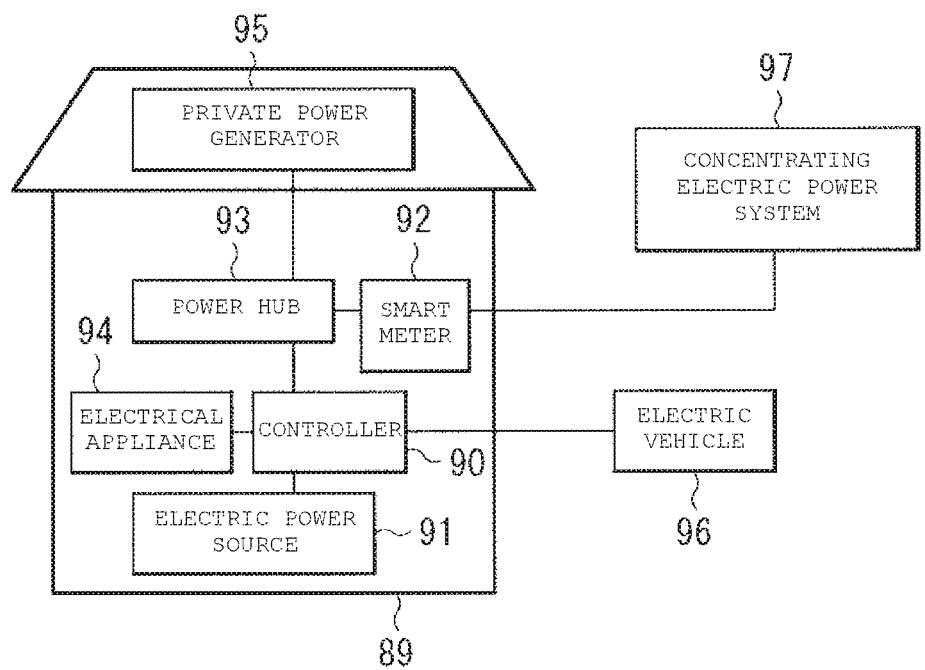
FIG. 7 is a block diagram illustrating a configuration of an application example (an electric power storage system) of the secondary battery according to an embodiment of the present technology.

FIG. 7 illustrates a block configuration of an electric power storage system.

For example, the electric power storage system includes a controller 90, an electric power source 91, a smart meter 92, and a power hub 93 inside a house 89 such as a general residence or a commercial building.

In this case, the electric power source 91 may be coupled to, for example, an electrical appliance 94 provided inside the house 89, and may be allowed to be coupled to an electric vehicle 96 parked outside the house 89. Further, for example, the electric power source 91 may be coupled to a private power generator 95 provided in the house 89 through the power hub 93, and may be allowed to be coupled to an outside concentrating electric power system 97 through the smart meter 92 and the power hub 93.

The electrical appliance 94 includes, for example, one or more home electric products such as a refrigerator, an air conditioner, a television, and a water heater. The private power generator 95 includes, for example, one or more of a solar power generator, a wind-power generator, and the like. The electric vehicle 96 includes, for example, one or more of an electric automobile, an electric motorcycle, a hybrid automobile, and the like. The concentrating electric power system 97 includes, for example, one or more of a thermal power plant, an atomic power plant, a hydraulic power plant, a wind-power plant, and the like.

The controller 90 controls an operation of the entire electric power storage system (including a used state of the electric power source 91). The controller 90 includes, for example, a CPU. The electric power source 91 includes one or more secondary batteries of the present technology. The smart meter 92 is, for example, an electric power meter that is compatible with a network and is provided in the house 89 demanding electric power, and may be communicable with an electric power supplier. Accordingly, for example, while the smart meter 92 communicates with outside, the smart meter 92 controls the balance between supply and demand in the house 89, which allows for effective and stable energy supply.

In the electric power storage system, for example, electric power may be accumulated in the electric power source 91 from the concentrating electric power system 97 as an external electric power source through the smart meter 92 and the power hub 93, and electric power is accumulated in the electric power source 91 from the private power generator 95 as an independent electric power source through the power hub 93. The electric power accumulated in the electric power source 91 is supplied to the electrical appliance 94 and the electric vehicle 96 in accordance with an instruction from the controller 90, so that the electrical appliance 94 becomes operable, and the electric vehicle 96 becomes chargeable. In other words, the electric power storage system is a system that makes it possible to accumulate and supply electric power in the house 89 with use of the electric power source 91.

The electric power accumulated in the electric power source 91 is usable as required. Thus, for example, electric power is accumulated in the electric power source 91 from the concentrating electric power system 97 in the middle of night when an electric rate is inexpensive, and the electric power accumulated in the electric power source 91 may be used during daytime hours when the electric rate is expensive.

The foregoing electric power storage system may be provided for each household (family unit), or may be provided for a plurality of households (a plurality of family units).

Figure 8:
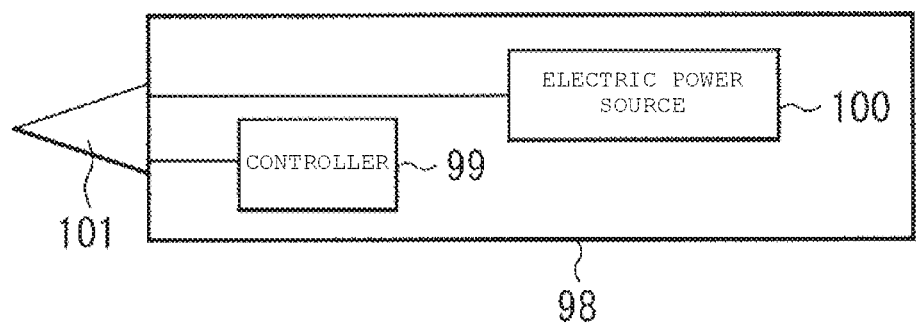
FIG. 8 is a block diagram illustrating a configuration of an application example (an electric power tool) of the secondary battery according to an embodiment of the present technology.

FIG. 8 illustrates a block configuration of an electric power tool.

The electric power tool described herein is, for example, an electric drill. The electric power tool includes, for example, a controller 99 and an electric power source 100 inside a tool body 98. For example, a drill section 101 as a movable section is attached to the tool body 98 in an operable (rotatable) manner.

The tool body 98 contains, for example, a plastic material. The controller 99 controls an operation of the entire electric power tool (including a used state of the electric power source 100). The controller 99 includes, for example, a CPU. The electric power source 100 includes one or more secondary batteries of the present technology. The controller 99 allows electric power to be supplied from the electric power source 100 to the drill section 101 in accordance with an operation by an operation switch.

EXAMPLES

Description is given on examples of the present technology.

Experimental Examples 1-1 to 1-12

A laminated-film-type lithium ion secondary battery illustrated in FIGS. 1 and 2 was fabricated by the following procedure using the first polymer compound as the polymer compound contained in the electrolyte layer 16.

In the case of fabricating the positive electrode 13, first, 98 parts by mass of a positive electrode active material ($LiCoO_2$), 1.2 parts by mass of a positive electrode binder (polyvinylidene fluoride), and 0.8 parts by mass of a positive electrode conductive agent (graphite) were mixed to obtain a positive electrode mixture. Subsequently, the positive electrode mixture was charged in an organic solvent (N-methyl-2-pyrrolidone), and the organic solvent was then stirred to obtain a paste-like positive electrode mixture slurry. Subsequently, both surfaces of the positive electrode current collector 13A (a strip-shaped aluminum foil having a thickness of 12 μm) were coated with the positive electrode mixture slurry with use of a coating apparatus, and thereafter, the positive electrode mixture slurry was dried to form the positive electrode active material layer 13B (area density=26.5 mg/cm$^2$). Finally, the positive electrode active material layer 13B was compression-molded with use of a roll pressing machine (volume density=3.8 g/cm$^3$).

In the case of fabricating the negative electrode 14, first, 92.5 parts by mass of a negative electrode active material (artificial graphite), 4.5 parts by mass of a negative electrode binder (polyvinylidene fluoride), and 3 parts by mass of a negative electrode conductive agent (vapor grown carbon fiber (VGCF)) were mixed to obtain a negative electrode mixture. Subsequently, the negative electrode mixture was charged in an organic solvent (N-methyl-2-pyrrolidone), and the organic solvent was then stirred to obtain a paste-like negative electrode mixture slurry. Subsequently, both surfaces of the negative electrode current collector 14A (a strip-shaped copper foil having a thickness of 10 μm) were coated with the negative electrode mixture slurry with use of a coating apparatus, and thereafter, the negative electrode mixture slurry was dried to form the negative electrode active material layer 14B. Finally, the negative electrode active material layer 14B was compression-molded with use of a roll pressing machine (volume density=1.6 g/cm$^3$).

In the case of forming the electrolyte layer 16, the first homopolymer was first dissolved in a solvent, and then the solvent prepared by dissolving the first homopolymer was stirred (stirring time=30 minutes to 1 hour) in a sealed container (temperature=70° C.) to prepare a first preparatory liquid. In this case, diethyl carbonate (DEC) which was chain carbonic acid ester was used as the solvent, and the mixing ratio (weight ratio) of the solvent and the first homopolymer was 1:1. The type of the first homopolymer, the solubility parameter (MPa$^{1/2}$), and the weight average molecular weight are as shown in Table 1. In this example, butyl polyacrylate (PBA), polymethyl methacrylate (PBM), polystyrene (PS), and polyvinyl acetate (PVAC) were used as the first homopolymer.

Subsequently, the second homopolymer or the second copolymer was dissolved in the solvent, and then the solvent prepared by dissolving the second homopolymer or the second copolymer was stirred (stirring time=30 minutes to 1 hour) in a sealed container (temperature=70° C.) to prepare a second preparatory liquid. In this case, ethylene carbonate (EC) and propylene carbonate (PC) which were cyclic carbonic acid esters and dimethyl carbonate (DMC) which was chain carbonic acid ester were used as solvents, and the mixing ratio (weight ratio) of ethylene carbonate, propylene carbonate, and dimethyl carbonate was 1:1:1. In addition, the mixing ratio (weight ratio) of the solvent and the second homopolymer was 1:1, and the mixing ratio (weight ratio) of the solvent and the second copolymer was 1:1. The type of the second homopolymer and the type and copolymerization amount (wt %) of the second copolymer are as shown in Table 1. The second homopolymer described above is polyvinylidene fluoride (PVDF).

Details concerning the contents of Table 1 are as follows. "VDF+HFP" represents a copolymer containing vinylidene fluoride and hexafluoropropylene as components. "VDF+CTFE" represents a copolymer containing vinylidene fluoride and chlorotrifluoroethylene as components. "VDF+TFE" represents a copolymer containing vinylidene fluoride and tetrafluoroethylene as components. All of these copolymers are random copolymers, and each copolymer has a weight average molecular weight of 600,000. The "copolymerization amount" represents each copolymerization amount of hexafluoropropylene, chlorotrifluoroethylene, and tetrafluoroethylene.

Upon confirmation, the solubility parameters of the second homopolymer and the second copolymer are as follows. Since the solubility parameter of polyvinylidene fluoride is 23.2 MPa$^{1/2}$, this value is more than 20 MPa$^{1/2}$. Since the solubility parameter of a copolymer containing as components vinylidene fluoride and hexafluoropropylene, chlorotrifluoroethylene, or tetrafluoroethylene is about 21 to 22, this value is more than 20 MPa$^{1/2}$.

Subsequently, after the first preparatory liquid and the second preparatory liquid were mixed, electrolyte salt (LiPF$_6$) was dissolved in the mixed liquid. The mixing ratio (weight ratio) of the first preparatory liquid and the second preparatory liquid is as shown in Table 1. In this case, the content of the electrolyte salt was 1 mol/kg with respect to the mixed liquid. Subsequently, the mixed liquid was stirred (stirring time=30 minutes to 1 hour) in a sealed container (temperature=70° C.) to obtain a sol precursor solution.

Finally, after the surface of the positive electrode 13 was coated (coating speed=20 m/min) with the precursor solution with use of a coating apparatus, the coated precursor solution was dried (drying temperature=30° C., drying time=30 seconds) to form the gel electrolyte layer 16. Likewise, after the surface of the negative electrode 14 was coated (coating speed=20 m/min) with the precursor solution with use of a coating apparatus, the coated precursor solution was dried (drying temperature=30° C., drying time=30 seconds) to form the gel electrolyte layer 16.

In the case of forming the electrolyte layer 16, for the sake of comparison, only the second homopolymer or the second copolymer was used, whereby the first homopolymer was not used. When only the second homopolymer or the second copolymer was used, the weight of the second preparatory liquid was set to be equal to the sum of the weight of the first preparatory liquid and the weight of the second preparatory liquid in the case of using the second homopolymer or the second copolymer together with the first homopolymer.

For the sake of comparison, polyacrylonitrile (PAN) as another homopolymer was used instead of the first homopolymer. Other solubility parameters (MPa$^{1/2}$) and weight average molecular weights are as shown in Table 1.

In the case where the secondary battery is assembled, first, the positive electrode lead 11 was welded to the positive electrode current collector 13A, and the negative electrode lead 132 was welded to the negative electrode current collector 14A. Subsequently, the positive electrode 13 having the electrolyte layer 16 formed and the negative electrode 14 having the electrolyte layer 16 formed were stacked with the separator 15 (microporous polyethylene film having a thickness of 25 μm) interposed therebetween, and then the stack was spirally wound to obtain a spirally wound body. Subsequently, after the spirally wound body was spirally wound in the longitudinal direction, the protective tape 17 was attached onto the outermost periphery of the spirally wound body, thereby forming the spirally wound electrode body 10. Finally, the outer package member 20 was folded to interpose the spirally wound electrode body 10, and thereafter, the outer edges of the outer package member 20 were thermally fused. As a result, the spirally wound electrode body 10 was enclosed in the outer package member 20. In this case, the close-contact film 21 was inserted between the positive electrode lead 11 and the outer package member 10, and the close-contact film 21 was inserted between the negative electrode lead 12 and the outer package member 20.

As a result, a laminated-film-type lithium secondary battery was completed.

Here, in order to evaluate battery characteristics of the secondary battery, when load characteristics of the secondary battery were examined, the results shown in Table 1 were obtained.

Upon examining the load characteristics, first, charging and discharging (1 cycle) was performed on the secondary battery in an ambient temperature environment (25° C.) so as to stabilize the battery state of the secondary battery. At the time of charging, the secondary battery was charged at a constant current of 0.2 C until the voltage reached 4.3 V, and thereafter, the secondary battery was discharged at a constant voltage of 4.3 V until the total charging time reached 8 hours. At the time of discharging, the secondary battery was discharged at a constant current of 0.2 C until the voltage reached 3 V. "0.2 C" is a value of a current that causes the battery capacity (theoretical capacity) to be completely discharged in 5 hours.

Subsequently, the secondary battery was charged and discharged again in the same environment to measure a discharge capacity at the second cycle. At the time of charging, the secondary battery was charged at a constant current of 0.2 C until the voltage reached 4.3 V, and thereafter, the secondary battery was discharged at a constant voltage of 4.3 V until the total charging time reached 8 hours. At the time of discharging, the secondary battery was discharged at a constant current of 0.2 C until the voltage reached 3 V.

Subsequently, the secondary battery was further charged and discharged in the same environment to measure a discharge capacity at the third cycle. The conditions during charging were set to the same conditions as in the case of measuring the discharge capacity at the second cycle. At the time of discharging, the secondary battery was discharged at a constant current of 2 C until the voltage reached 3 V. "2 C" is a value of a current that causes the battery capacity (theoretical capacity) to be completely discharged in 0.5 hours.

Finally, a capacitance retention rate (%)=(discharge capacity at the third cycle with a discharge current of 2 C/discharge capacity at the second cycle with a discharge current of 0.2 C)×100 was calculated.

[Table 1]

TABLE 1

| | Polymer compound (first polymer compound) | | | | | | | Solvent | | |
|---|---|---|---|---|---|---|---|---|---|---|
| | First homopolymer | | | Another homopolymer | Second copolymer | | | | | |
| | | | Weight | | | | | Cyclic | Chain | |
| Experimental Examples | Type | Solubility parameter (MPa$^{1/2}$) | average molecular weight | Second homopolymer Type | Type | Copolymerization amount (wt %) | Mixing ratio | carbonic acid ester Type | carbonic acid ester Type | Capacitance retention rate (%) |
| 1-1 | PBA | 18.0 | 300,000 | — | VDF + HFP | 7 | 1:1 | EC, PC | DEC, DMC | 98 |
| 1-2 | PBM | 17.9 | 300,000 | — | VDF + HFP | 7 | 1:1 | EC, PC | DEC, DMC | 95 |
| 1-3 | PS | 17.4~19.1 | 300,000 | — | VDF + HFP | 7 | 1:1 | EC, PC | DEC, DMC | 92 |
| 1-4 | PVAC | 17.99 ± 0.02 | 300,000 | — | VDF + HFP | 7 | 1:1 | EC, PC | DEC, DMC | 89 |
| 1-5 | PBA | 18.0 | 300,000 | — | VDF + HFP | 7 | 1:2 | EC, PC | DEC, DMC | 93 |
| 1-6 | PBA | 18.0 | 300,000 | — | VDF + CTFE | 7 | 1:1 | EC, PC | DEC, DMC | 94 |
| 1-7 | PBA | 18.0 | 300,000 | — | VDF + TFE | 7 | 1:1 | EC, PC | DEC, DMC | 90 |
| 1-8 | PBA | 18.0 | 300,000 | PVDF | — | — | 1:1 | EC, PC | DEC, DMC | 88 |
| 1-9 | — | — | — | — | VDF + HFP | 7 | — | EC, PC | DEC, DMC | 74 |
| 1-10 | — | — | — | PVDF | — | — | — | EC, PC | DEC, DMC | 67 |
| 1-11 | PBA | 18.0 | 50,000 | — | VDF + HFP | 7 | 1:1 | EC, PC | DEC, DMC | 51 |
| 1-12 | PAN | 25.6 | 100,000 | — | VDF + HFP | 7 | 1:1 | EC, PC | DEC, DMC | 39 |

PBA: polybutyl acrylate,
PBM: polybutyl methacrylate,
PS: polystyrene,
PVAC: polyvinyl acetate,
PAN: polyacrylonitrile,
PVDF: polyvinylidene fluoride,
VDF: vinylidene fluoride,
HFP: hexafluoropropylene,
CTFE: chlorotrifluoroethylene,
TFE: tetrafluoroethylene,
EC: ethylene carbonate,
PC: propylene carbonate,
DEC: diethyl carbonate As is apparent from Table 1, the capacitance retention rate greatly varied depending on the composition of the polymer compound contained in the electrolyte layer 16.

In detail, since the polymer compound contained only the second homopolymer or the second copolymer, when the polymer compound did not contain the first homopolymer (Experimental Examples 1-9 and 1-10), a sufficient capacitance retention rate could not be obtained.

Further, also in the case where the polymer compound contained another homopolymer or the like together with the second homopolymer or the second copolymer (Experimental Examples 1-11 and 1-12), a sufficient capacitance retention rate naturally could not be obtained.

On the other hand, when the polymer compound contained the first polymer compound, that is, when the polymer compound contained the first homopolymer together with the second homopolymer or the second copolymer (Experimental Examples 1-1 to 1-8), a sufficient capacitance retention rate could be obtained.

That is, when a first homopolymer having a solubility parameter of 17 $MPa^{1/2}$ to 20 $MPa^{1/2}$ and a weight average molecular weight of not less than 100,000 was used as the first homopolymer, and when polyvinylidene fluoride was used as the second homopolymer (Experimental Examples 1-8), a high capacitance retention rate could be obtained.

On the other hand, when the first homopolymer described above was used, and when a copolymer containing vinylidene fluoride as a component was used as the second copolymer (Experiment Examples 1-1 to 1-7), a high capacitance retention rate could be obtained.

In particular, when the polymer compound contained the first homopolymer together with the second homopolymer or the second copolymer (Experimental Examples 1-1 and 1-8), the following tendencies were obtained.

First, a high capacitance retention rate could be obtained irrespective of which of the second homopolymer and the second copolymer was used (Experiment Examples 1-1 to 1-8).

Second, in the case of using the second copolymer (Experimental Examples 1-1, 1-6, and 1-7), a high capacitance retention rate could be obtained, regardless of the type of monomer used together with vinylidene fluoride.

Third, even when the solvent contained chain carbonic acid ester together with cyclic carbonic acid ester, a high capacitance retention rate could be obtained.

Experimental Examples 2-1 to 2-8

A secondary battery was fabricated by the same procedure as in Experimental Examples 1-1 to 1-12 except that the second polymer compound was used as the polymer compound contained in the electrolyte layer 16, and the battery characteristics (load characteristics) were examined.

When the electrolyte layer 16 was formed, the same procedure was used except for the procedure described below.

First, the third copolymer was dissolved in a solvent to prepare a third preparatory liquid. In this case, chain carbonic acid ester (diethyl carbonate) was used as the solvent, and the mixing ratio (weight ratio) of the solvent and the third copolymer was 1:1. The type and copolymerization amount (wt %) of the third copolymer are as shown in Table 2. The "copolymerization amount" for the third copolymer shown in Table 2 represents each copolymerization amount of hexafluoropropylene, chlorotrifluoroethylene, and tetrafluoroethylene.

Subsequently, the fourth homopolymer or the fourth copolymer was dissolved in a solvent to prepare a fourth preparatory liquid. In this case, cyclic carbonic acid esters (ethylene carbonate and propylene carbonate) were used as solvents, and the mixing ratio (weight ratio) of ethylene carbonate and propylene carbonate was 1:1. In addition, the mixing ratio (weight ratio) of the solvent and the fourth homopolymer was 1:1, and the mixing ratio (weight ratio) of the solvent and the fourth copolymer was 1:1. The type of the fourth homopolymer and the type and copolymerization amount (wt %) of the fourth copolymer are as shown in Table 2.

The fourth homopolymer described above is polyvinylidene fluoride (PVDF). The "copolymerization amount" for the fourth copolymer shown in Table 2 represents each copolymerization amount of hexafluoropropylene, chlorotrifluoroethylene, and tetrafluoroethylene.

Subsequently, after the third preparatory liquid and the fourth preparatory liquid were mixed, electrolyte salt ($LiPF_6$) was dissolved in the mixed liquid. The mixing ratio (weight ratio) of the third preparatory liquid and the fourth preparatory liquid is as shown in Table 2.

In the case of forming the electrolyte layer 16, for the sake of comparison, only the fourth homopolymer or the fourth copolymer was used, whereby the third copolymer was not used. When only the fourth homopolymer or the fourth copolymer was used, the weight of the fourth preparatory liquid was set to be equal to the sum of the weight of the third preparatory liquid and the weight of the fourth preparatory liquid in the case of using the fourth homopolymer or the fourth copolymer together with the third copolymer.

For the sake of comparison, both the fourth homopolymer and the fourth copolymer were used.

Here, when the load characteristics of the secondary battery were examined, the results shown in Table 2 were obtained.

[Table 2]

TABLE 2

| | Polymer compound (second polymer compound) | | | | | | Solvent | | |
| | Third copolymer | | Fourth copolymer | | | | Cyclic | Chain | |
| Experimental Examples | Type | Copolymerization amount (wt %) | Fourth homopolymer Type | Type | Copolymerization amount (wt %) | Mixing ratio | carbonic acid ester Type | carbonic acid ester Type | Capacitance retention rate (%) |
|---|---|---|---|---|---|---|---|---|---|
| 2-1 | VDF + HFP | 20 | — | VDF + HFP | 7 | 1:1 | EC, PC | DEC | 97 |
| 2-2 | VDF + CTFE | 20 | — | VDF + HFP | 7 | 1:1 | EC, PC | DEC | 94 |
| 2-3 | VDF + TFE | 20 | — | VDF + HFP | 7 | 1:1 | EC, PC | DEC | 91 |
| 2-4 | VDR + HFP | 20 | — | VDF + HFP | 7 | 1:2 | EC, PC | DEC | 93 |
| 2-5 | VDF + HFP | 20 | PVDF | — | — | 1:1 | EC, PC | DEC | 90 |
| 2-6 | — | — | — | VDF + HFP | 7 | — | EC, PC | DEC | 74 |
| 2-7 | — | — | PVDF | — | — | — | EC, PC | DEC | 67 |
| 2-8 | — | — | PVDF | VDF + HFP | 7 | 1:1 | EC, PC | DEC | 70 |

PVDF: polyvinylidene fluoride,
VDF: vinylidene fluoride,
HFP: hexafluoropropylene,
CTFE: chlorotrifluoroethylene,
TFE: tetrafluoroethylene,
EC: ethylene carbonate,
PC: propylene carbonate,
DEC: diethyl carbonate As is apparent from Table 2, the capacitance retention rate greatly varied depending on the composition of the polymer compound contained in the electrolyte layer 16.

In detail, since the polymer compound contained only the fourth homopolymer or the fourth copolymer, when the polymer compound did not contain the third copolymer (Experimental Examples 2-6 and 2-7), a sufficient capacitance retention rate could not be obtained.

Further, also in the case where the polymer compound contained the fourth homopolymer and the fourth copolymer together (Experimental Example 2-8), a sufficient capacitance retention rate naturally could not be obtained.

On the other hand, when the polymer compound contained the second polymer compound, that is, when the polymer compound contained the fourth homopolymer and the fourth copolymer together with the third copolymer (Experimental Examples 2-1 to 2-5), a sufficient capacitance retention rate could be obtained.

That is, when a copolymer which contained vinylidene fluoride, hexafluoropropylene, and the like as components and in which the copolymerization amount of hexafluoropropylene or the like was not less than 15% by weight was used as the third copolymer, and when polyvinylidene fluoride was used as the fourth homopolymer (Experimental Example 2-5), a high capacitance retention rate could be obtained.

On the other hand, when the third copolymer described above was used, and when a copolymer which contained vinylidene fluoride, hexafluoropropylene, and the like as components and in which the copolymerization amount of hexafluoropropylene or the like was less than 15% by weight was used as the fourth copolymer (Experimental Examples 2-1 to 2-4), a high capacitance retention rate could be obtained.

In particular, when the polymer compound contained the fourth homopolymer or the fourth copolymer together with the third copolymer (Experimental Examples 2-1 to 2-5), the following tendencies were obtained.

First, a high capacitance retention rate could be obtained irrespective of which of the fourth homopolymer and the fourth copolymer was used (Experiment Examples 2-1 to 2-5).

Second, in the case of using the third copolymer (Experimental Examples 2-1 to 2-5), a high capacitance retention rate could be obtained, regardless of the type of monomer used together with vinylidene fluoride.

Third, in the case of using the fourth copolymer (Experimental Examples 2-1 to 2-4), a high capacitance retention rate could be obtained, regardless of the type of monomer used together with vinylidene fluoride.

Fourth, even when the solvent contained chain carbonic acid ester together with cyclic carbonic acid ester, a high capacitance retention rate could be obtained.

From the results shown in Table 1 and Table 2, when the polymer compound contained in the electrolyte layer contains the first polymer compound or the second polymer compound, the load characteristics of the secondary battery were improved. Thus, excellent battery characteristics were obtained in the secondary battery including the electrolyte layer.

Although not specifically verified here, even when the polymer compound contains both the first polymer compound and the second polymer compound, the load characteristics of the secondary battery are improved, so that excellent battery characteristics should be obtained in the secondary battery.

The present technology is described thus far with reference to embodiments and examples thereof; however, the present technology is not limited to the examples described in the embodiments and examples above, but various modifications may be made.

Specifically, the description has been given of, as an example, the case in which the battery structure is of a laminated-film-type and the battery element has a spirally wound structure. However, applicable structures are not limited thereto. The secondary battery of the present technology is similarly applicable to a case where the secondary battery has other battery structure such as a cylindrical type a square type, or a coin shape and to a case where the battery element has other structure such as a stacked structure.

Moreover, description has been given of the lithium ion secondary battery in which the capacitance of the negative electrode is obtained by insertion and extraction of lithium. However, this is not limitative. For example, the secondary battery of the present technology may be a lithium metal secondary battery in which the capacitance of the negative electrode is obtained by precipitation and dissolution of lithium. Alternatively, for example, the secondary battery of the present technology may be a secondary battery in which the capacitance of the negative electrode is obtained as the sum of the capacitance obtained by insertion and extraction of lithium and the capacitance obtained by precipitation and dissolution of lithium by causing the capacitance of the negative electrode material capable of inserting and extracting lithium to be smaller than the capacitance of the positive electrode.

Moreover, the description has been given of the case where lithium is used as the electrode reactant. However, the electrode reactant is not limited thereto. The electrode reactant may be, for example, other Group 1 element such as sodium (Na) and potassium (K) in the long form of the periodic table, a Group 2 element such as magnesium (Mg) and calcium (Ca) in the long form of the periodic table, or other light metal such as aluminum (Al). Alternatively, the electrode reactant may be an alloy including one or more of the foregoing series of elements.

The effects described in the present specification are illustrative and non-limiting, and the technology may have effects other than those described in the present specification.

The present technology is described below in a further detail according to an embodiment.

(1)

A secondary battery including an electrolyte layer, which includes an electrolytic solution and a polymer compound, together with a positive electrode and a negative electrode,
in which
the polymer compound includes at least one of a first polymer compound and a second polymer compound,
the first polymer compound contains:
a first homopolymer which contains no vinylidene fluoride as a component and has a solubility parameter of 17 $MPa^{1/2}$ to 20 $MPa^{1/2}$ and a weight average molecular weight of not less than 100,000; and
at least one of a second homopolymer which contains vinylidene fluoride as a component and a second copolymer which contains vinylidene fluoride as a component, and
the second polymer compound contains:
a third copolymer which contains as components vinylidene fluoride and at least one of hexafluoropropylene, chlorotrifluoroethylene, tetrafluoroethylene, and monomethyl maleate and in which a copolymerization amount of at least one of the hexafluoropropylene, the chlorotrifluoroethylene, the tetrafluoroethylene, and the monomethyl maleate is not less than 15% by weight; and at least one of a fourth homopolymer containing vinylidene fluoride as a component and a fourth copolymer which contains as components vinylidene fluoride and at least one of hexafluoropropylene, chlorotrifluoroethylene, tetrafluoroethylene and monomethyl maleate and in which the copolymerization amount of at least one of the hexafluoropropylene, the chlorotrifluoroethylene, the tetrafluoroethylene and the monomethyl maleate is less than 15% by weight.

(2)

The secondary battery according to (1), in which the first homopolymer includes at least one of polybutyl acrylate, polybutyl methacrylate, polystyrene, polyvinyl acetate, polyethyl methacrylate, polyether urethane, polyallyl acetate, and polymethyl acrylate.

(3)

The secondary battery according to (1) or (2), in which the second copolymer contains as a component at least one of hexafluoropropylene, chlorotrifluoroethylene, tetrafluoroethylene, and monomethyl maleate.

(4)

The secondary battery according to any one of (1) to (3), in which the electrolytic solution contains a solvent, and the solvent includes chain carboxylic ester.

(5)

The secondary battery according to (4), in which the chain carboxylic ester includes at least one of dimethyl carbonate, diethyl carbonate, and ethylmethyl carbonate.

(6)

The secondary battery according to (4) or (5), in which the solvent further includes cyclic carboxylic ester, and the cyclic carboxylic ester includes at least one of ethylene carbonate and propylene carbonate.

(7)

The secondary battery according to (6), in which the solvent includes the chain carbonic acid ester and the cyclic carbonic acid ester, and the content of the chain carbonic acid ester in the solvent is not less than 10% by weight and not more than 90% by weight.

(8)

The secondary battery according to any one of (1) to (7), which is a lithium ion secondary battery.

(9)

A battery pack including:

the secondary battery according to any one of (1) to (8);

a controller that controls an operation of the secondary battery; and a switch section that switches the operation of the secondary battery according to an instruction of the controller.

(10)

An electric vehicle including:

the secondary battery according to any one of (1) to (8);

a convertor that converts electric power supplied from the secondary battery into drive power;

a drive section that operates according to the drive power; and a controller that controls an operation of the secondary battery.

(11)

An electric power storage system including:

the secondary battery according to any one of (1) to (8);

at least one electrical appliance that is supplied with electric power from the secondary battery; and a controller that controls electric power supply from the secondary battery to the electrical appliance.

(12)

An electric power tool including:

the secondary battery according to any one of (1) to (8); and a movable section that is supplied with electric power from the secondary battery.

(13)

An electronic apparatus including the secondary battery according to any one of (1) to (8) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising an electrolyte layer including an electrolytic solution and a polymer compound, a positive electrode, and a negative electrode, wherein the polymer compound includes one or both of a first polymer compound and a second polymer compound, the first polymer compound further includes:

a first homopolymer includes no vinylidene fluoride and has a solubility parameter of 17 $MPa^{1/2}$ to 20 $MPa^{1/2}$ and a weight average molecular weight of no less than 100,000; and one or both of a second homopolymer including vinylidene fluoride and a second copolymer including vinylidene fluoride, and the second polymer compound includes:

a third copolymer including vinylidene fluoride and one or more of hexafluoropropylene, chlorotrifluoroethylene, tetrafluoroethylene, and monomethyl maleate and a copolymerization amount of one or more of hexafluoropropylene, chlorotrifluoroethylene, tetrafluoroethylene, and monomethyl maleate is not less than 15% by weight; and one or both of a fourth homopolymer including vinylidene fluoride and a fourth copolymer including vinylidene fluoride and one or more of hexafluoropropylene, chlorotrifluoroethylene, tetrafluoroethylene and monomethyl maleate and a copolymerization amount of one or more of hexafluoropropylene, chlorotrifluoroethylene, tetrafluoroethylene and monomethyl maleate is less than 15% by weight.

2. The secondary battery according to claim 1, wherein the first homopolymer includes one or more of polybutyl acrylate, polybutyl methacrylate, polystyrene, polyvinyl acetate, polyethyl methacrylate, polyether urethane, polyallyl acetate, and polymethyl acrylate.

3. The secondary battery according to claim 1, wherein the second copolymer includes one or more of hexafluoropropylene, chlorotrifluoroethylene, tetrafluoroethylene, and monomethyl maleate.

4. The secondary battery according to claim 1, wherein the electrolytic solution includes a solvent, and the solvent includes chain carbonic acid ester.

5. The secondary battery according to claim 4, wherein the chain carbonic acid ester includes one or more of dimethyl carbonate, diethyl carbonate, and ethylmethyl carbonate.

6. The secondary battery according to claim 4, wherein the solvent further includes cyclic carbonic acid ester, and the cyclic carbonic acid ester includes one or both of ethylene carbonate and propylene carbonate.

7. The secondary battery according to claim 6, wherein the solvent includes the chain carbonic acid ester and the cyclic carbonic acid ester, and a content of the chain carbonic acid ester in the solvent is no less than 10% by weight and no more than 90% by weight.

8. The secondary battery according to claim 1, wherein the secondary battery includes a lithium ion secondary battery.

9. A battery pack comprising:
a controller configured to control an operation of the secondary battery; and
a switch configured to switch the operation of the secondary battery according to an instruction of the controller,
wherein
the secondary battery comprises an electrolyte layer including an electrolytic solution and a polymer compound, a positive electrode, and a negative electrode,
the polymer compound including one or both of a first polymer compound and a second polymer compound,
the first polymer compound further includes:
a first homopolymer includes no vinylidene fluoride and has a solubility parameter of 17 MPa1/2 to 20 MPa1/2 and a weight average molecular weight of no less than 100,000; and
one or both of a second homopolymer including vinylidene fluoride and a second copolymer including vinylidene fluoride, and
the second polymer compound includes:
a third copolymer including vinylidene fluoride and one or more of hexafluoropropylene, chlorotrifluoroethylene, tetrafluoroethylene, and monomethyl maleate and a copolymerization amount of one or more of hexafluoropropylene, chlorotrifluoroethylene, tetrafluoroethylene, and monomethyl maleate is not less than 15% by weight; and
one or both of a fourth homopolymer including vinylidene fluoride and a fourth copolymer including vinylidene fluoride and one or more of hexafluoropropylene, chlorotrifluoroethylene, tetrafluoroethylene and monomethyl maleate and a copolymerization amount of one or more of hexafluoropropylene, chlorotrifluoroethylene, tetrafluoroethylene and monomethyl maleate is less than 15% by weight.

10. A electric vehicle comprising:
a secondary battery;
a convertor configured to convert electric power supplied from the secondary battery into drive power;
a drive section configured to operate according to the drive power; and
a controller configured to control an operation of the secondary battery,
wherein
the secondary battery comprises an electrolyte layer including an electrolytic solution and a polymer compound, a positive electrode, and a negative electrode,
the polymer compound includes one or both of a first polymer compound and a second polymer compound,
the first polymer compound further includes:
a first homopolymer includes no vinylidene fluoride and has a solubility parameter of 17 MPa1/2 to 20 MPa1/2 and a weight average molecular weight of no less than 100,000; and
one or both of a second homopolymer including vinylidene fluoride and a second copolymer including vinylidene fluoride, and
the second polymer compound includes:
a third copolymer including vinylidene fluoride and one or more of hexafluoropropylene, chlorotrifluoroethylene, tetrafluoroethylene, and monomethyl maleate and a copolymerization amount of one or more of hexafluoropropylene, chlorotrifluoroethylene, tetrafluoroethylene, and monomethyl maleate is not less than 15% by weight; and
one or both of a fourth homopolymer including vinylidene fluoride and a fourth copolymer including vinylidene fluoride and one or more of hexafluoropropylene, chlorotrifluoroethylene, tetrafluoroethylene and monomethyl maleate and a copolymerization amount of one or more of hexafluoropropylene, chlorotrifluoroethylene, tetrafluoroethylene and monomethyl maleate is less than 15% by weight.

11. An electric power storage system comprising:
the secondary battery according to claim 1;
at least one electrical appliance configured to be supplied with electric power from the secondary battery; and
a controller configured to control electric power supply from the secondary battery to the electrical appliance.

12. An electric power tool comprising:
the secondary battery according to claim 1; and
a movable section configured to be supplied with electric power from the secondary battery.

13. An electronic apparatus comprising the secondary battery according to claim 1 as an electric power supply source.

* * * * *